Dec. 31, 1935.  J. P. STOCKTON  2,026,257
PHONOGRAPH
Filed Aug. 8, 1930  9 Sheets-Sheet 1
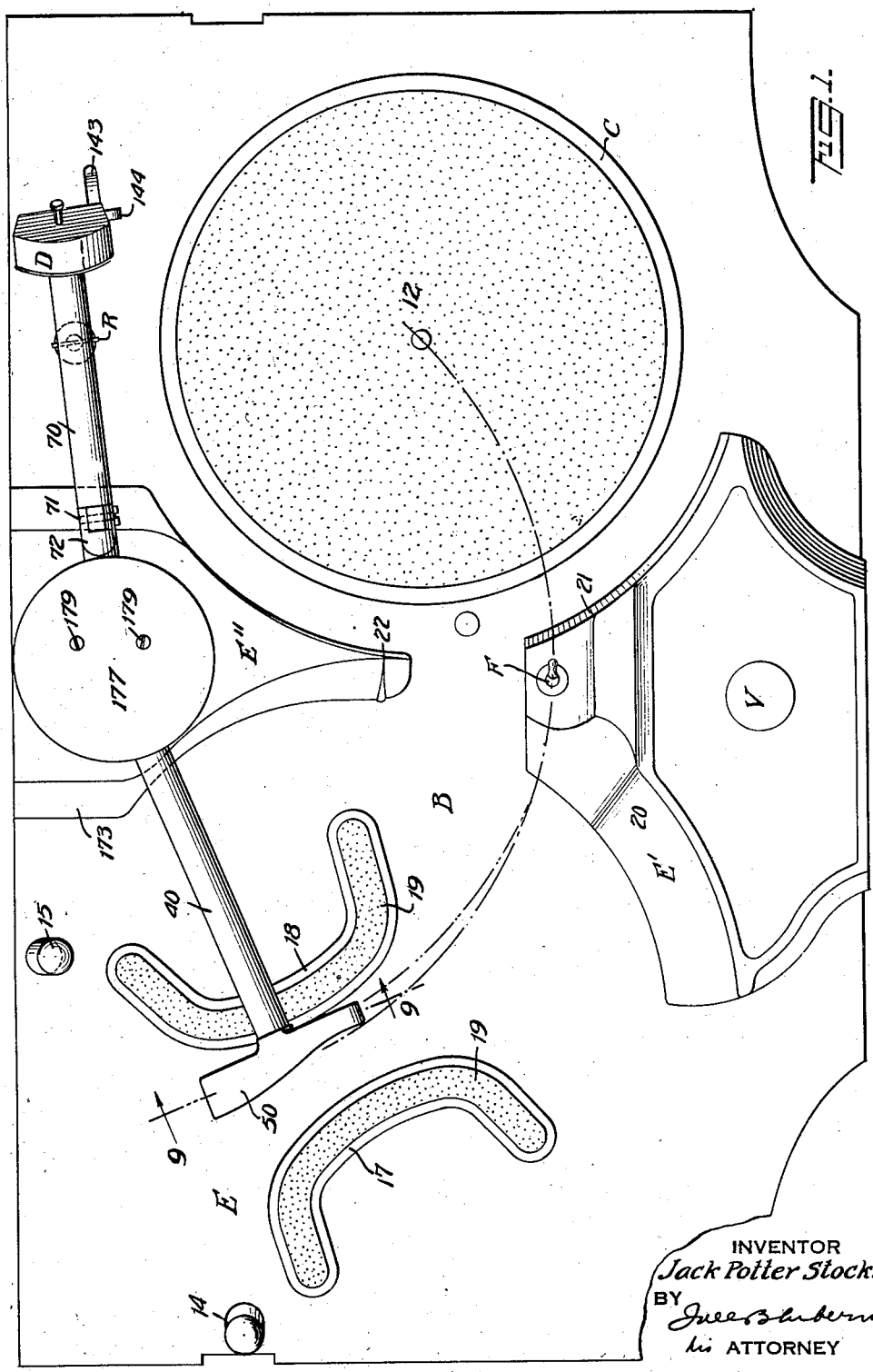
INVENTOR
Jack Potter Stockton
BY
his ATTORNEY Dec. 31, 1935. J. P. STOCKTON 2,026,257
PHONOGRAPH
Filed Aug. 8, 1930 9 Sheets-Sheet 2
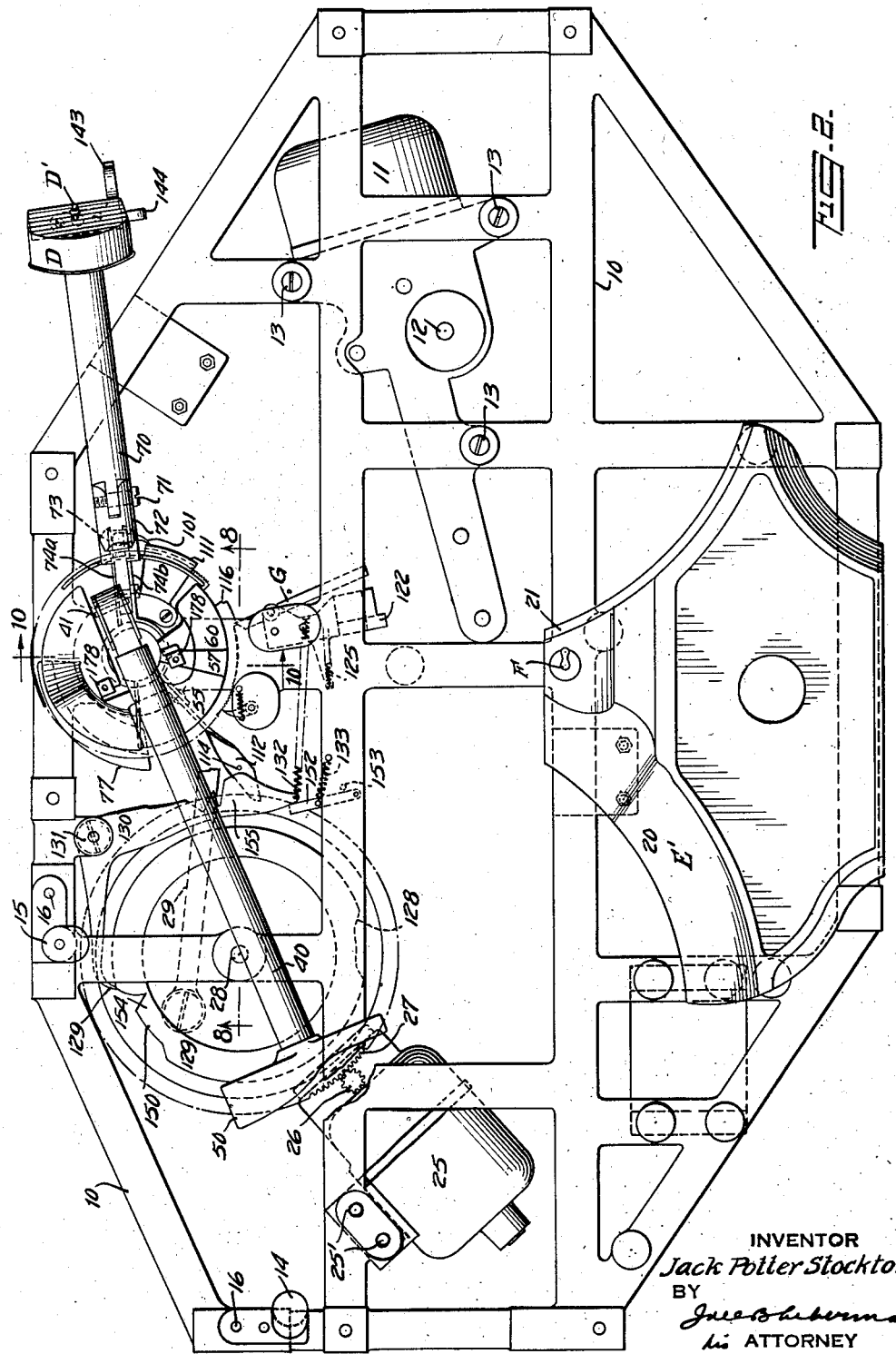
INVENTOR
Jack Potter Stockton
BY
his ATTORNEY

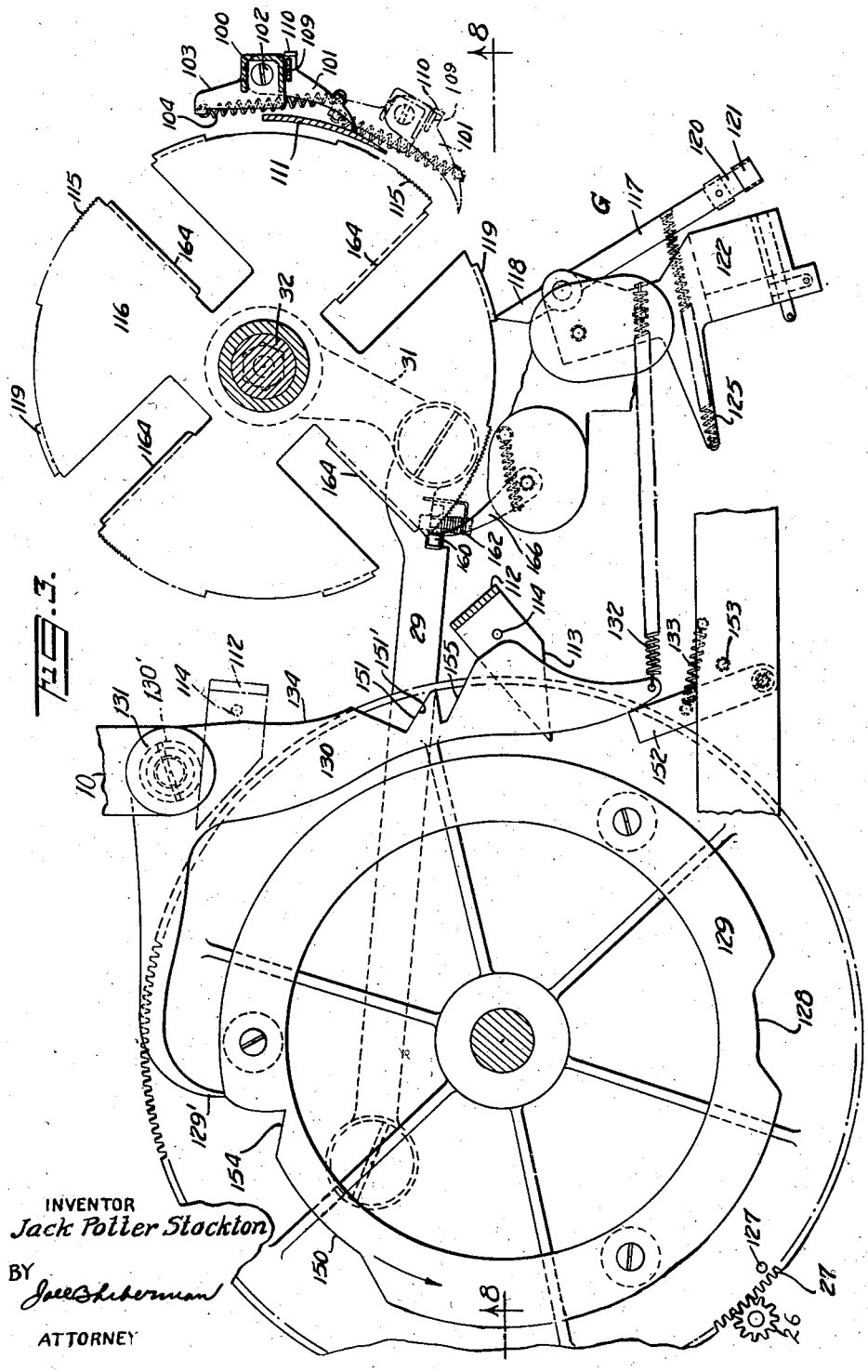

Dec. 31, 1935.  J. P. STOCKTON  2,026,257
PHONOGRAPH
Filed Aug. 8, 1930  9 Sheets-Sheet 4
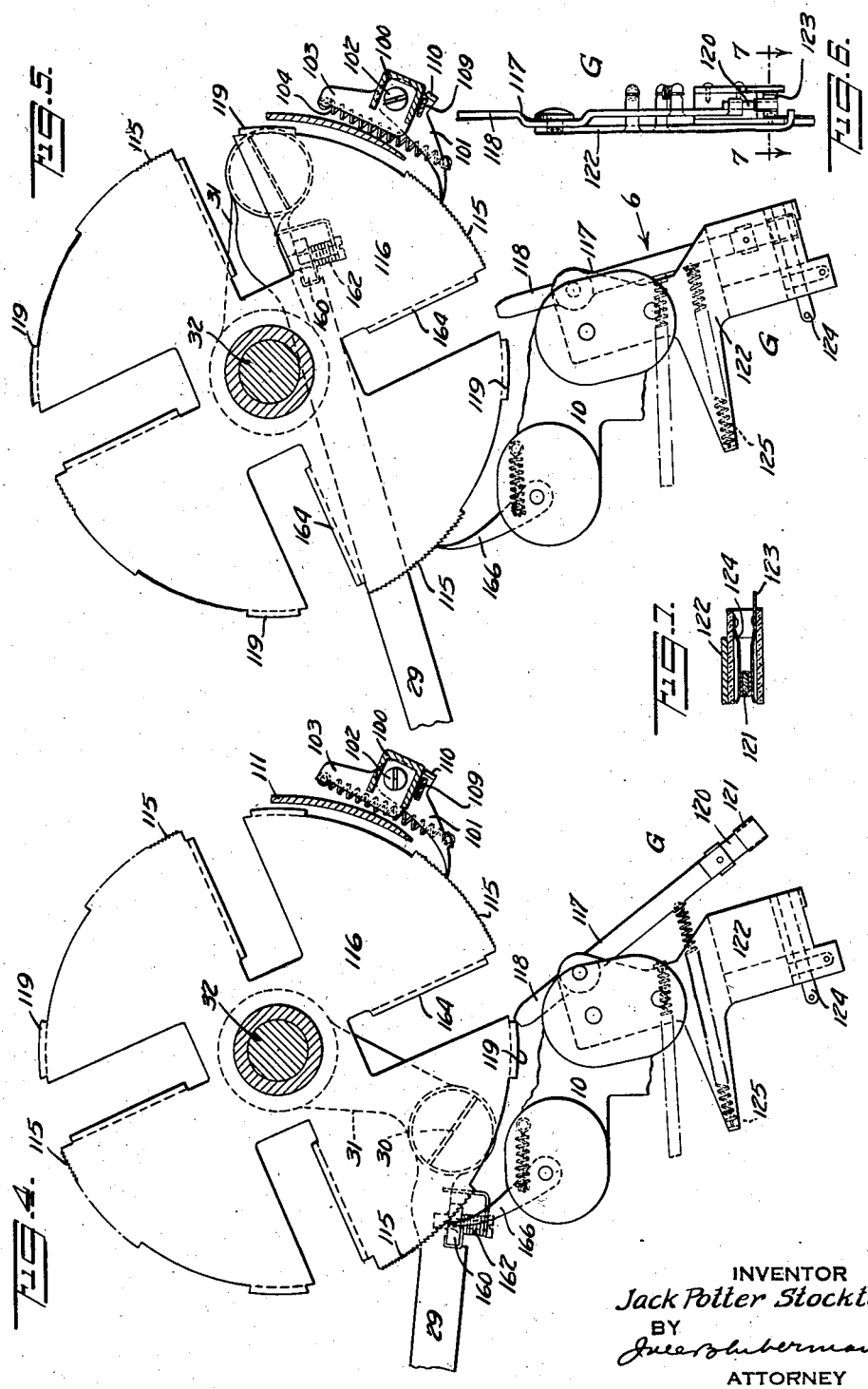
INVENTOR
Jack Potter Stockton
BY
ATTORNEY

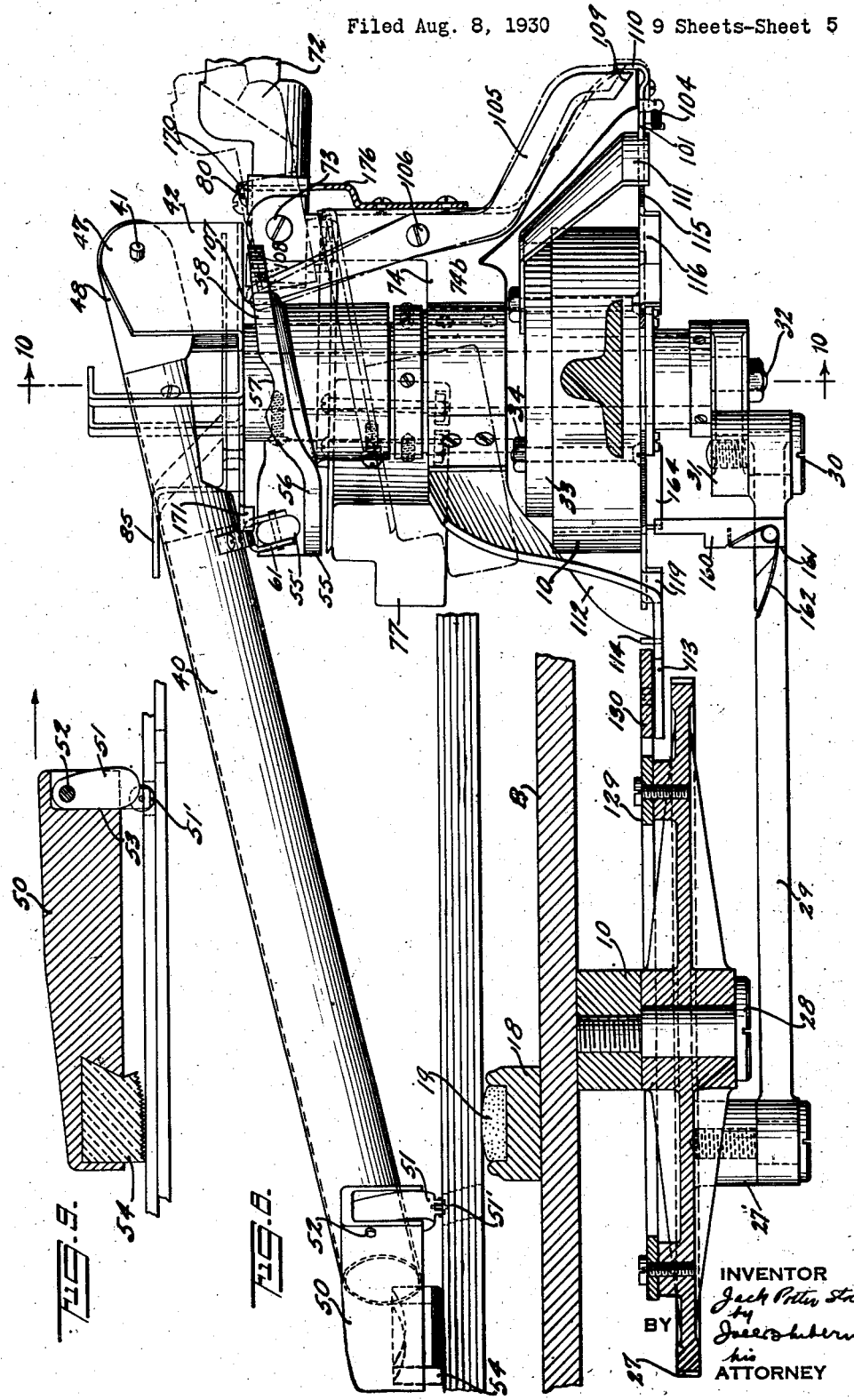

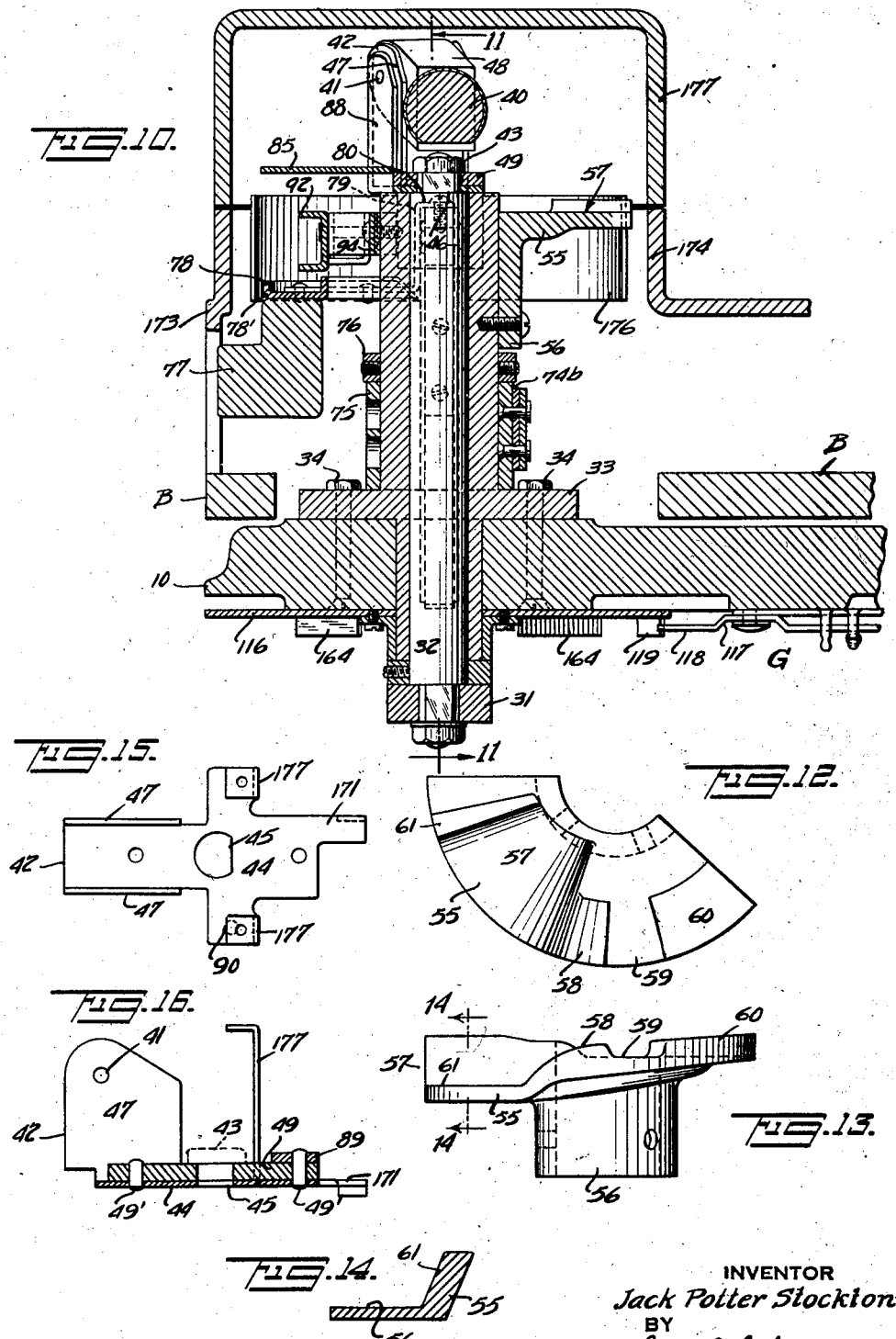

Dec. 31, 1935.  J. P. STOCKTON  2,026,257
PHONOGRAPH
Filed Aug. 8, 1930  9 Sheets-Sheet 7
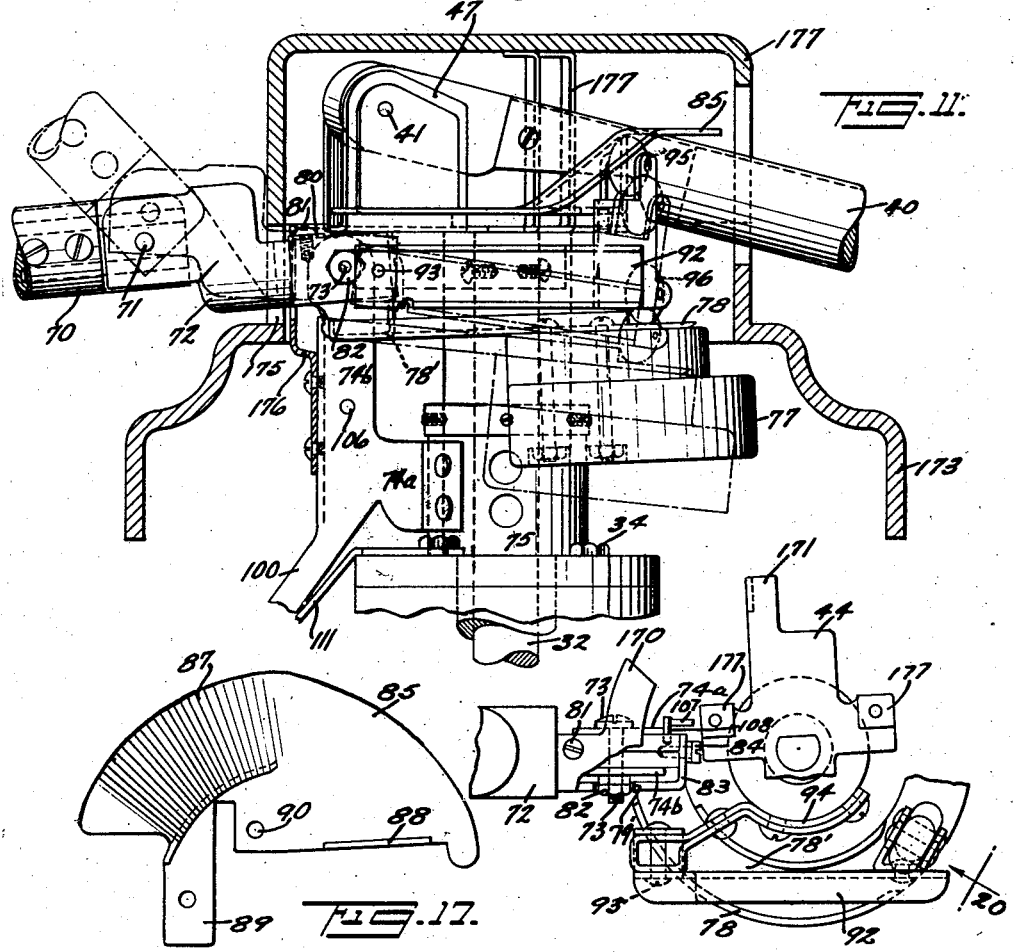
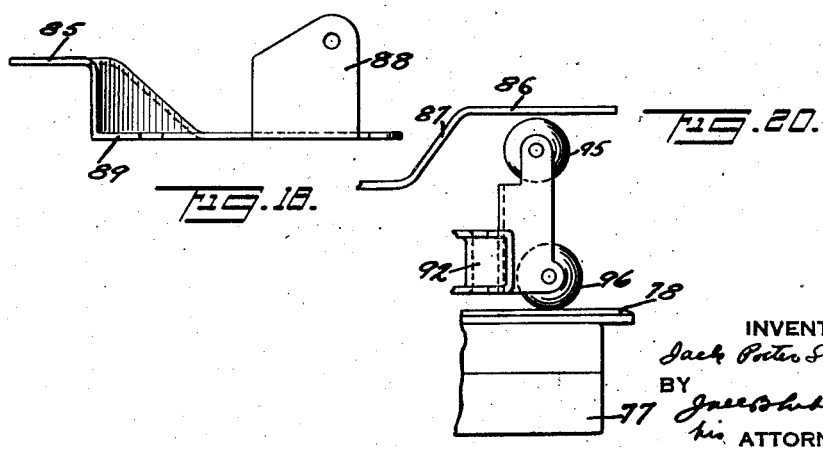
INVENTOR
Jack Porter Stockton
BY
his ATTORNEY Dec. 31, 1935. J. P. STOCKTON 2,026,257
PHONOGRAPH
Filed Aug. 8, 1930 9 Sheets-Sheet 8
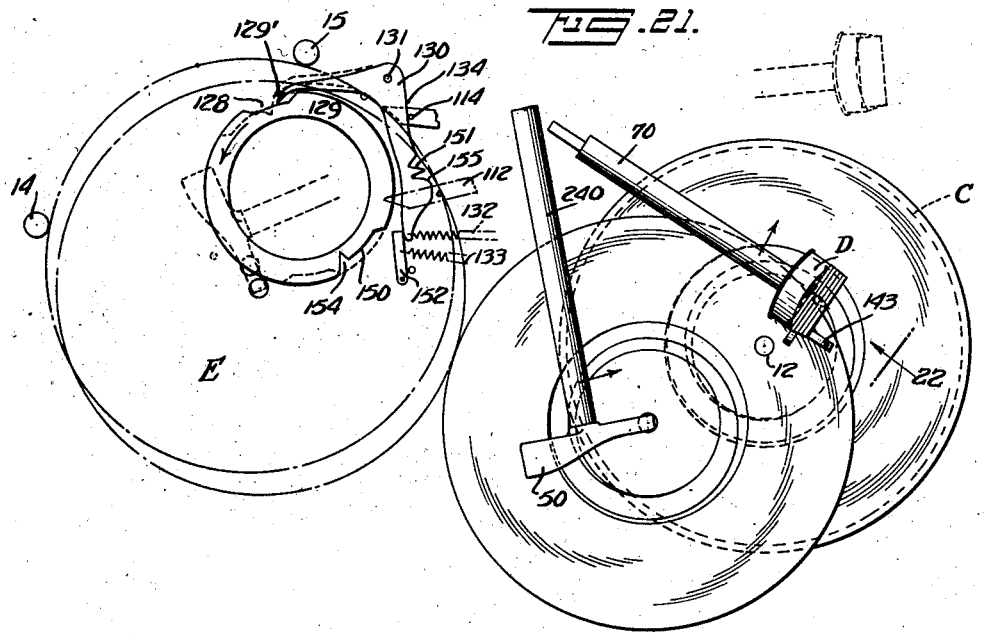
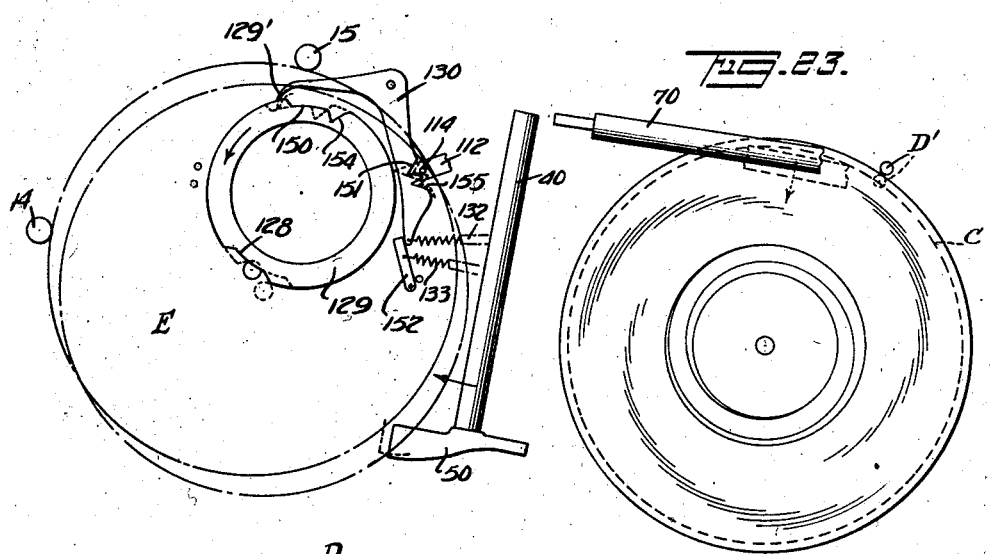
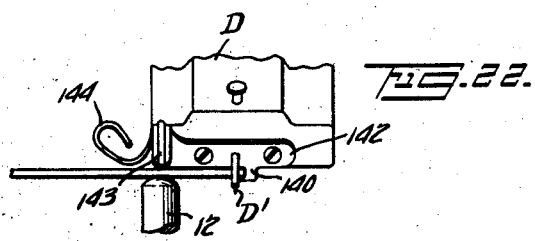
INVENTOR
Jack Potter Stockton
BY
ATTORNEY Dec. 31, 1935.    J. P. STOCKTON    2,026,257
PHONOGRAPH
Filed Aug. 8, 1930    9 Sheets-Sheet 9
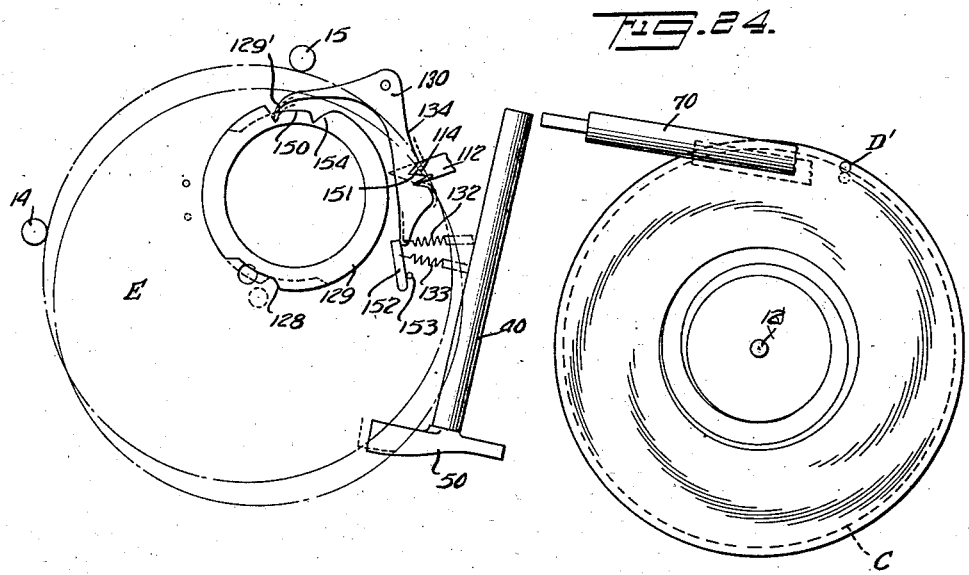
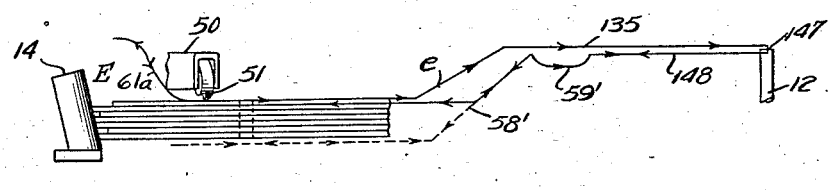
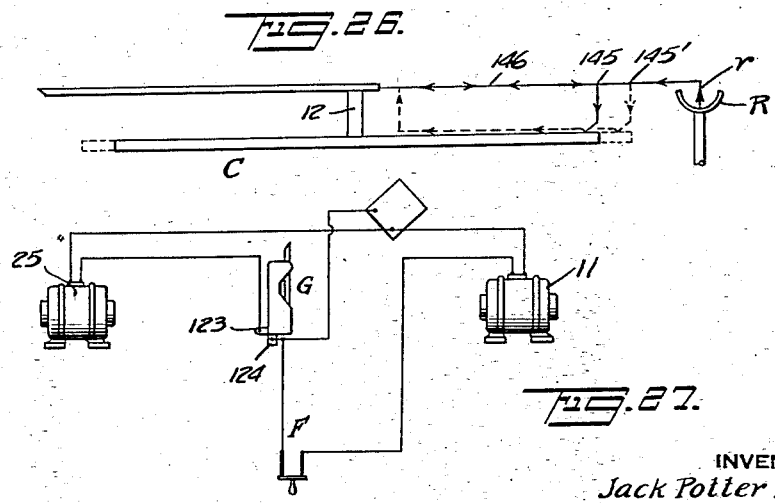
INVENTOR
Jack Potter Stockton
BY
ATTORNEY Patented Dec. 31, 1935

2,026,257

UNITED STATES PATENT OFFICE 2,026,257

PHONOGRAPH

Jack Potter Stockton, Spring Lake, N. J., assignor to Stromberg-Carlson Telephone Manufacturing Company, Rochester, N. Y., a corporation of New York Application August 8, 1930, Serial No. 473,995

103 Claims. (Cl. 274—10)

The present invention relates to phonographs and is more particularly directed toward an automatic multiple record phonograph wherein a series of records may be played on a rotating record support, the succeeding record being automatically deposited on top of a record which has already been played, all the mechanism for accomplishing this shifting of the record being automatically set into operation upon the completion of the playing of said record. In this manner the records are brought onto the rotating record support and stacked on it one above the other.

The invention also contemplates an automatic multiple record phonograph wherein substantially all the operating parts are carried underneath the phonograph table so that these parts are invisible above the phonograph table. The few parts which are to be seen above the phonograph table are unobtrusive and so arranged as to present a pleasing appearance.

According to the present invention, the machine works entirely automatically so that the transferring of a record onto the playing platform automatically places the parts into position to play a record of that size. This resetting operation, according to record size, is carried out for each record so that one is at liberty to use either size of records or any arrangement of records of both sizes.

Furthermore, the invention contemplates an automatic record changing phonograph provided with a record storage device and record handling mechanism so arranged that careful placing of the records in the storage device is unnecessary for the satisfactory operation of the phonograph. The present invention contemplates the placing of the records of the desired repertoire or selection of records in the storage device or magazine in the desired order and irrespective of the size of the various records. The deposit of these records is made without care being taken to bring them to definite positions relative to one another except that the upper record is slid over the stack to a predetermined position. The remaining records in the stack are in indeterminate relation, merely resting on those underneath. After the upper record has been transferred to the playing platform, the record to be played next is automatically shifted to the desired position where it remains until the mechanism functions to shift it to the rotating playing platform.

The present invention contemplates a number of improvements over the form of multiple record phonographs shown in my co-pending applications, Ser. Nos. 262,190 and 448,279, now Patent No. 1,992,334, granted February 26, 1935. These relate to improvements in the design of the phonograph and the arrangement of the parts so as to afford greater ease of manufacture and assembly, as well as lower cost of parts employed.

Among the improvements which may be enumerated are the following: the provision of mechanism whereby the reproducer support is rendered ineffective to control the record shifting mechanism when the reproducer support is above a predetermined elevation, as, for example, when inserting a new needle; the provision of an improved mechanism for placing the needle in the initial playing position for various sized records; the provision of improved mechanism whereby the reproducer support is shifted in toward the center of the turn table to meet an oncoming record being shifted from the magazine; the provision of a friction drag to insure that this reproducer support properly engages the record to facilitate placing it on the turn table; the provision of an improved form of record magazine wherein the records are supported horizontally in the magazine; the provision of an improved center post with associated record shifting and reproducer supporting mechanism; the provision of an improved form of record control switch adapted to be closed at the end of the playing of a record for starting the auxiliary motor for the record shifting operation; and an improved assembly which permits the securement of the table and record guides to the chassis after all adjustments and tests have been completed, and without disturbing the same.

Other and further objects of the invention will be pointed out as the description proceeds.

The accompanying drawings show, for purposes of illustrating the present invention, one of the many possible embodiments in which the invention may take form, it being understood that the drawings are illustrative of the invention rather than limiting the same.

In these drawings:

Figure 1 is a top plan view of the multiple record phonograph showing the cover panel or stationary phonograph table, and the parts above it in the idle position and with the starting switch in the off position;

Figure 2 is a top plan view with the parts in the same position as in Figure 1 but with the cover panel, the playing platform and the rear record guide removed to show the chassis and parts secured to it;

Figure 3 is a section taken just below the chassis and showing a top plan view of the parts of the record shifting mechanism and the record control switch below the same, the full lines showing these parts in the position of rest, the dot and dash lines showing that the reproducer support may be manually actuated without affecting the switch for the auxiliary motor;

Figure 4 is a top plan view showing the record control switch and associated mechanism in the position assumed at the end of a record and just before the auxiliary motor switch is closed;

Figure 5 is a view similar to Figure 4 showing the record controlled switch released to start the auxiliary motor;

Figure 6 is an elevational view taken in the direction of the arrow 6 of Figure 5;

Figure 7 is a section on the line 7—7 of Figure 6 showing the contacts of the switch;

Figure 8 is an elevational view looking from the front of the machine and showing the center post and record shifting arm in the position normally assumed at the end of a cycle, parts being shown in section on the line 8—8 of Figures 2 and 3;

Figure 9 is a sectional view taken through the record shifting arm on the line 9—9 of Figure 1 and showing the same in position to start shifting a record;

Figure 10 is a vertical sectional view through the center post and associated parts taken on the line 10—10 of Figures 2 and 8;

Figure 11 is an elevational view of the center post assembly taken at right angles to Figure 10 and showing parts in section along the line 11—11 of Figure 10, the pickup arm and counter-weight being shown in dotted lines in the position for insertion of a new needle into the pickup;

Figures 12, 13 and 14 are top plan, side elevational and sectional views illustrating the stationary cam for guiding the record shifting arm, Figure 14 being taken on the line 14—14 of Figure 13;

Figures 15 and 16 are top plan and sectional views showing the saddle carried at the upper end of the oscillatory shaft and supporting the record shifting arm and movable cam plate;

Figures 17 and 18 are top plan and side elevational views of the movable cam plate which raises and lowers the reproducer support;

Figure 19 is a top plan view showing the inner end of the reproducer supporting arm, the support for the counter weight and rollers which cooperate with the stationary cam of Figure 17 to control the elevation of the reproducer support;

Figure 20 is an elevational view taken in the direction of the arrow 20 of Figure 19;

Figure 21 is a diagrammatic top plan view illustrating in full lines the position of parts after the record has been brought against the pickup and in dotted lines the positions of certain of the parts at the end of the record shifting cycle;

Figure 22 is a fragmentary view in the direction of the arrow 22 of Figure 21;

Figure 23 is a view similar to Figure 21 illustrating in full lines the position of the parts after the record has been deposited on the playing platform and the record shifting arm has returned part way to the magazine, and showing in dotted lines the position of certain of the parts just prior to the deposit of the needle on the record;

Figure 24 is a view similar to Figure 23 illustrating in full lines the position of the parts just prior to the deposit of the needle on the record and in dotted lines the position of the parts when the needle has been placed on the record;

Figure 25 is a diagrammatic view illustrating the path of the record shifting pin;

Figure 26 is a diagrammatic view illustrating the path of the needle; and

Figure 27 is a wiring diagram.

The multiple record phonograph herein shown is designed more particularly for use with an electric pickup and electromagnetic sound amplification apparatus, the latter forming a part of a conventional broadcast receiver.

The phonograph is adapted for installation in the upper part of the radio cabinet. The phonograph has a flat table or cover panel B which extends across the top of the cabinet, and above the table are the turn table C, the electric pickup or reproducer D and stylus D', the record magazine E, and record guides E' and E''. The phonograph is under the control of a snap switch F located underneath the front guide E'. All the fixed and stationary parts of the device are secured to a metal chassis or frame plate 10, skeletonized to reduce weight. The table or board B merely conceals this frame and all the mechanism carried beneath.

The turn table C is driven by a turn table motor 11 which operates a long spindle 12 adapted to extend up through the stack of records as they are placed onto the table or playing platform C. This motor unit with reduction gears and governor is secured to the chassis 10 by bolts indicated at 13. The motor is adapted to be connected to the current supply through the switch F, as indicated in Figure 27. This current supply will usually be under the control of a main switch in the phonograph which controls the vacuum tubes of the amplifier.

The record magazine E is disposed at the left of the phonograph table or cover panel B. As here shown this magazine is in the form of two obliquely, upwardly extending posts 14 and 15. These posts are secured to the chassis 10 by screws indicated at 16. The posts are preferably covered by soft material such as rubber.

The bottom of the magazine is formed by C-shaped record supports 17 and 18 secured to the panel B in any desired manner. These record supports may be made of wood and are preferably provided with a felt strip, as indicated at 19. The front and rear record guides E' and E'' are preferably made of molded material such as bakelite and they have the shape indicated in Figure 1. The front record guide is adapted to support the turn table switch F and the volume controller V for the pickup circuit, not shown. It also provides an inclined front wall 20 for the record magazine and tends to confine the records to the center part of the magazine. The rear record guide E'' is placed on the upper rear part of the table and serves to separate the storage compartment from the turn table. These record guides E' and E'' have posts passing down through holes in the plate B and are secured directly to the chassis.

The summits of the record guides E' and E'' are indicated at 21 and 22 and they are arranged to be at the same elevation as the top of the center pin or spindle 12 of the turn table so that these three points are able to support a record in horizontal position.

The record shifting operation is carried out by an auxiliary motor 25 which, together with reduction gears, not shown, is secured as a unit by screws 25' to the under side of the chassis. The auxiliary motor 25 drives a pinion 26 in mesh with a gear 27 adapted to make one revolution during a record shifting cycle. This motor is under the control of a trip switch indicated generally at G, and this switch is adapted to be automatically closed at the end of the playing of a record or to be manually closed to start the auxiliary motor 25. It is also adapted to be opened automatically at the end of the cycle to stop the motor. The mechanisms for carrying out these operations will be described later.

The gear 27 is pivoted on a stud 28 carried by the chassis 10, and the lower side of the gear body 27 has a boss 27', Fig. 8, which carries a connecting rod 29, the other end of which is connected at 30 with a crank 31, non-rotatably secured on the lower end of a vertical shaft 32. This shaft 32 is mounted in a bearing post 33, secured to the chassis 10 by bolts indicated at 34. It will thus be seen that the connections between the motor and the vertical shaft 32 are such that this vertical shaft will be oscillated back and forth once for each revolution of the master gear 27.

This oscillatory movement of the shaft is employed for actuating a record shifting arm 40, pivotally secured at 41 in a rearwardly extending bifurcated saddle 42, non-rotatably secured to the upper end of the shaft 32 by a nut 43. This saddle member may be in the form of a stamping and is shown in detail in Figures 15 and 16. It has a bottom plate 44 with a non-circular aperture 45 to fit the reduced end 46 of the shaft 32. Upwardly extending members 47 are adapted to embrace the inner end 48 of the record shifting arm 40. A plate 49 is interposed between the nut 43 and the bottom of the plate 44 and secured by rivets 49'.

The free end of the record shifting arm 40 is enlarged as indicated at 50 and carries on the front part thereof a record pickup pin 51 provided with a roller 51' and pivoted as indicated at 52. The pin may hang free on this pivot, and its rearward movement is limited by the wall 53 of the opening which receives the pin. The rear of the pickup arm head 50 is provided with a rubber record pusher indicated at 54. This record shifting arm is adapted to lower under the influence of gravity and to rest on top of the stack of records in the magazine. The records may be placed in the magazine by merely raising the record arm up far enough to permit inserting the repertoire underneath. The magazine may readily accommodate about twelve records, and in placing them in the magazine no care is exercised as to the order in which ten or twelve inch records are inserted, nor is any care taken to place them in any particular position in the magazine except that, at the starting of the phonograph, the uppermost record is placed with its edge against the posts 14 and 15, as is indicated in Figure 21. The remaining records may be in indeterminate relation in the magazine and the repertoire will merely rest as a loose stack of records.

The angular relation of the bottom or record bearing part of the magazine and its side walls is designed so that it will place the loci of record centers (whether ten or twelve inch records) in proper position so that when the upper record of the stack is pushed back against the side walls formed by the posts 14 and 15, these loci are intersected by the path of the record shifting pin 51 as it swings about the vertical axis of the shaft 32 and lowers on its horizontal pivot 41. In the particular arrangement shown it is possible to have the magazine with its bottom walls horizontal.

The record shifting arm 40 is supported by the record during the transfer of the record from the magazine to the playing platform, but on its return movement is supported by a roller 55' which bears on the stationary cam 55 shown in detail in Figures 12, 13 and 14. The hub 56 of this cam is secured to the center post bearing 33. The cam has a substantially flat lower portion 57, a gradually rising portion 58, a drop portion 59 and a flat portion 60 in the order named. The rear of the cam has a very steep portion indicated at 61.

*Reproducer support and associated parts*

The reproducer D is carried on a swinging arm 70, pivoted at 71 to a short connecting member 72 which in turn is pivotally secured at 73 to a stamping 74 forming a reproducer support. This stamping has downwardly and inwardly extending feet 74a and 74b riveted to a ring 75 which is revolvably carried outside the center bearing member 33 and which is held between the flange on this member and a retaining ring 76. (Fig. 10.)

The joint between the parts 70 and 72 is such that the weight of the reproducer normally holds these parts in the position indicated in full lines in Figure 11 but it permits the raising of the reproducer upwardly as indicated in dot and dash lines in this figure.

The weight of the reproducer is balanced by a counter-weight 77 secured to it by a stamping 78, as shown in Figures 10, 11 and 19. This stamping has a channel shaped arcuate portion 78' for supporting the counter-weight as indicated in Figures 10 and 19 and an upwardly extending portion at 79 which extends up along the rear side of the member 72 and across the top side of this member, as indicated at 80. A screw 81 secures this top flange of the stamping 78 to the member 72 while the upwardly extending part 79 is apertured as indicated at 79' to accommodate the nut 82 for the pivot bolt 73. The stamping 78 also extends rearwardly, as indicated at 83, so as to pass behind the rear end of the member 72. A screw 84 secures this rear extension 83 to the member 72. The counter-weight is thus rigidly secured to the member 72 which supports the reproducer arm 70. The counter-weight is over-balanced by the reproducer D but limits the weight on the needle or stylus of the reproducer. The counter-weight and reproducer swing as a unit about the bearing formed by the center post 33.

The reproducer is adapted to be raised and lowered automatically during the record shifting operation by means of a movable cam plate 85, shown in detail in Figures 17 and 18. This cam plate has a horizontal portion 86, a camming portion 87, and an upwardly extending portion 88, as there shown. It is also provided with an extension 89 which receives the rivet 49' as shown in Figure 16. It is also riveted to the saddle member 42 and spacer 43 by a rivet which passes through the holes 90 of these parts. The upwardly extending flange 88 is placed adjacent the flange 47 as shown in Figure 10, and the pivot pin 41 for the record shifting arm passes through these parts. The position of this cam will, therefore, depend upon the angular position of the record shifting arm.

The cam 85 acts on a roller arm bracket 92, shown in detail in Figures 19 and 20. This roller arm bracket is pivotally secured at 93 to a supporting strap 94, fixedly carried by the post 33. The roller bracket 92 carries rollers 95 and 96, as indicated, the upper roller being underneath the cam plate 85 while the lower roller is on the cam track formed by the stamping 78. As the record shifting arm 40 is moved about during the record shifting operation, it carries the cam 85 with it, and through the medium of the bracket 92, acts to depress the counterweight and raise the reproducer as shown in Figure 11, or passes beyond so as to permit the reproducer to lower. During the playing of the record the bracket 92 is supported by the lower roller 96.

The reproducer supporting stamping 74 extends obliquely downwardly, as indicated at 100 and pivotally supports a pawl 101 about a post 102. The stamping has a rearward extension 103 to support one end of a spring 104, the other end of which is secured to the pawl as indicated. The pawl is normally urged inwardly by this spring and is utilized to actuate the control switch G for the auxiliary motor.

A pawl lifter 105 is pivoted at 106 to the stamping 74. The upper end 107 of the pawl lifter is adjacent a pin 108 (see Figs. 8 and 19) carried by the reproducer supporting member 72. When the reproducer is in normal position, it is low enough so that the pin 108 is held away from the pawl lifter 105, but when the reproducer is lifted above a pre-determined height, as indicated in Figure 8, the pin operates on the pawl lifter to move its lower end 109 against an extension 110 carried by the pawl 101, so as to hold the pawl in an outer position, as indicated in dot and dash lines in Figures 3 and 8. During a portion of the swinging movement of the reproducer arm the pawl is held against an arcuate plate 111 secured to the flange of the center post 33.

A reproducer support actuating and positioning arm 112 is secured to the stamping 74 and extends down underneath the table B of the phonograph, as is more clearly indicated in Figure 8. This arm 112 has a camming surface 113 and a vertical pin 114. The arm 112 and pawl 101 are adapted to swing back and forth with the reproducer support, being pivoted with it about the vertical axis 32.

When the record shifting mechanism is at the end of a cycle and the reproducer is in the idle position, the parts are in the position shown by full lines in Figures 1, 2, 3, 8, 10 and 11, and by dotted lines in Figure 21. The trip switch G is opened, as indicated in Figures 2 and 3.

It will be assumed that the repertoire of records has been placed in the magazine with the uppermost record pushed against the stops 14 and 15 and the turn table motor switch F shifted to the left to start the motor. The reproducer arm is then lifted off of the rest R shown in Figures 1 and 26 and while held in the hand is shifted in toward the center of the turn table at a convenient distance above the surface of the turn table but without placing it on the table. It is then returned to the rest, positioning the arm 112 as shown in Figures 2 and 3, but this movement has set the record shifting mechanism into operation, as will now be described.

The inward movement of the reproducer support will move the pawl 101 from the position shown in full lines in Figure 3 to the position shown in full lines in Figure 4, the pawl passing beyond the shield plate 111 and engaging with one of the sections of ratchet teeth 115 of a disk 116 loosely pivoted about the lower end of the center post bearing 33. The pawl thus moves this ratchet plate in a clockwise direction.

The trip switch G is held open as indicated in Figures 2 and 3 at the end of the previous record shifting cycle. This switch G has a switch lever 117 and a short arm 118, engageable with one of the switch operating lugs 119 carried by the disk 116. The switch arm 117 may be made of metal and carries, at the end, an insulating extension 120 adapted to carry a contact 121. The arm 117 is pivoted to a plate 122 adapted to be secured to the lower side of the chassis 10. This plate 122 carries two insulated contacts 123 and 124 which are in the circuit of the auxiliary motor and adapted to be bridged by the contact piece 121, as shown in Figure 7. The switch G is urged toward closed position by a coiled spring 125, as indicated.

As the reproducer is moved inwardly, the pawl 101 causes the cam disk to move from the position of Figure 3 to the position of Figure 4 and then to the position of Figure 5, by which time it has released the trip switch G and closed the circuit for the auxiliary motor. The gear 27 is approximately in the position shown in Figure 3 at the end of each record shifting cycle and turns in a counter-clockwise direction, as indicated by the arrow.

First, looking to the apparatus above the table B, it will be seen that the connecting rod 29 starts to move the record shifting arm 40. It first moves this arm rearwardly so as to cause the roller 55' to climb up the steep inclined portion 61 of the cam 55. This movement is indicated by the portion 61a of the curve shown in Figure 25. The roller then passes along the upper rear part of the cam plate. This operation raises the record pickup arm above the records in the magazine and allows the pickup pin 51 to lower, as indicated in Figure 9. The arm then begins to move forwardly and lowers until the roller 51' engages with the upper surface of the uppermost record. This roller supports the record shifting arm above the record until it passes through the center hole of the record, as indicated in Figure 9. Further movement of the record shifting mechanism will cause the pin to carry the record along with it. Soon the record reaches the record guides E' and E'', which cause the record to become tilted as it is carried up along the guides. This portion of the path of the record shifting pin is indicated in Figure 25 by the letter e.

While the record has thus been moved up the incline, and while it is still supported by both of the record guides, the cam 85 has engaged the upper roller 95 of the bracket arm 90 and has depressed the counter-weight to raise the reproducer upwardly away from the rest R, as indicated at r in Figure 26. When the reproducer is thus raised, it is moved inwardly by the pin 127, carried by the gear wheel 27. This pin travels around until it reaches the camming surface 113 of the lever 112, swinging with the reproducer. Further movement of the gear causes the pin 27 to shift the reproducer from the dotted line position of Figure 21 to the full line position of Figure 21. During this movement the pawl 101 is held by the lifter 105. Just before this movement is completed, a cutout portion 128, on a cam 129, carried by the wheel 27, has been brought to the position shown in Figure 21. This allows the nose 129' of a bell-crank shaped follower 130, pivoted at 131, to move in a counter-clockwise direction under the influence of springs 132 and 133, thereby causing the arcuate edge 134 of the bell-crank follower to engage with the pin 114 carried by the swinging arm 112. This provides a frictional connection which offers material resistance to the movement of the reproducer support until released.

After the record has been carried up along the incline, it passes by the summits 21 and 22 of the record guides, and its front edge lowers onto the spindle 12 of the turn table. The record then moves horizontally, as indicated at 135 in Figure 25. After the edge of the record passes by the post 12, it passes underneath the reproducer D, as indicated in Figures 21 and 22. The edge of the record engages a depending finger 140, forming part of a stamping 142 secured to the reproducer D. This finger is so located that the edge of the record does not contact with the stylus D'. The stamping 140 also has balancing fingers 143 and 144 which prevent tilting of the record during the latter part of the transfer.

The record shifting arm then moves from the position shown in Figure 21 until it has transported the record beyond the guides so that it is supported solely from underneath by the spindle 12 until the center hole is reached, at which time it drops onto the turn table.

The moving of the record so that the center hole coincides with the spindle has moved the reproducer to pre-playing position, depending upon the diameter of the record being shifted, and this will leave the reproducer arm 70 in substantially the position shown in Figure 23, with the needle or stylus D' beyond the periphery of the record and held at an elevation above the records, as indicated at 145 or 145' in Figure 26. The path of the stylus, while the reproducer is moving in to meet the record and is moved out with the record, is indicated by the horizontal line 146 of Figure 26.

When the record drops onto the turn table, the record shifting arm 50 lowers, as indicated at 147 in Figure 25, until the roller 55' engages with the outer part 60 of the cam. The connecting rod 29 has now passed by dead center and acts to return the record shifting arm toward the magazine. It moves leftwardly along the line 148, as indicated by the arrows pointing to the left in Figure 25. Its path is determined by the shape of the cam 55. The extent, however, to which it lowers in the magazine is determined by the height of the stack of records present in the magazine, the record shifting arm lowering onto the uppermost record and moving rearwardly across the record, as indicated. Near the latter part of its movement the rubber pad 54 acts to shift the record rearwardly to bring it from the indeterminate position indicated in Figure 24 to the predetermined position where the edge of the record is against the stops 14 and 15. This will place the uppermost record in predetermined position so that its center hole will be in the position to be engaged by the record shifting pin during the next record shifting operation.

The lowering of the needle or stylus onto the playing surface of the record is accomplished just before the end of the cycle of the record shifting mechanism. After the cam plate 129 is moved, so that the cutout 128 passes beyond the end of the follower, the follower is moved back, so that the end of the follower rides along the edge of the cam. This time the pressure is comparatively great, as both springs 132 and 133 are acting on the follower. The vertical movement of the needle toward the record is controlled by the cam 85, and the parts are so timed that, when this cam comes into operation, the cam disk 129 is moved to the position shown in Figure 23. This cam 129 has a cutout portion 150 against which the nose 129' of the follower 130 may be moved by the springs 132 and 133, as shown in Figure 24.

When a ten inch record has been shifted onto the playing platform, it has left the stylus D' and reproducer supporting arm 70 in the position indicated in Figure 23. At this time the pin 114 carried by the arm 112 is opposite a notch 151' in the follower 130. This notch has a camming surface 151 which is brought against the pin 114 when the follower 130 moves under the influence of the springs 132 and 133 from the position of Figure 23 to the position of Figure 24. This movement causes the stylus to shift from the position of Figure 23, where it is beyond the edge of the record, to the dotted line position of Figure 23 or the full line position of Figure 24, where it is above the margin of the record. The spring 133 has moved the lever 152 against a stop 153 so that the spring 133 cannot act on the follower to move it further inwardly.

As the cam 129 continues to move, the surface 150 of the follower rides along underneath the tip 129' of the follower until it comes to the notch or cutout portion 154. This position is indicated in dotted lines in Figure 24. The spring 132, which is very much weaker than the spring 133, now acts on the follower to move it from the full line position of Figure 24 toward the dotted line position. This shifts the reproducer arm and stylus inwardly a further amount, so that the needle is caused to enter the lead-in groove in the record. As this movement is accomplished by a relatively weak spring, there is no tendency for the stylus placing mechanism to cause the stylus to jump out of the record groove once it has entered it. This movement of the stylus is accomplished very quickly and the cam 129 then withdraws the follower to the full line position of Figures 2 and 3, so that there is now nothing to interfere with the swinging movement of the reproducer.

The follower 130 has a notch 155, similar to the notch 151, for the purpose of shifting the stylus inwardly when a twelve inch record has been deposited on the platform.

At the end of the record the stylus enters either a helical groove or an eccentric groove, depending upon the make of record being used. The helical groove will move the pawl 101 far enough to trip the switch G. In case an eccentric groove of large diameter is present on the record, the pawl will be ratcheted back and forth on the disk 116, and, on each inward movement, will advance the disk so that ultimately the switch will be tripped. This, however, ordinarily takes place on the first sudden inward movement after the record is completed.

The teeth 115 on the disk extend through a predetermined angle so that the disk can be moved only to a predetermined extent by the reproducer support. Should the reproducer support continue to oscillate or again be moved inwardly before the auxiliary motor operates, the pawl will pass back and forth over the toothless portion of the disk. This prevents excess movement of the disk in case the auxiliary motor should fail to start as intended.

The resetting of the trip switch to open position is accomplished by mechanism connected with the crank 29 and shown more in detail in Figures 3, 4 and 8. The connecting rod 29 has an upwardly extending pawl 160, held against a stop 161 by a spring 162, as indicated in Figure 8. The ratchet disk 116 has four downwardly extending presetting lugs 164, as indicated in Figures 3, 4, 8 and 10.

At the end of a record shifting cycle, the pawl 160 and one of the lugs 164 are in the relative position indicated in Figure 3. The ratchet plate 116 is free to move in a clockwise direction without interference by these parts. When, however, the auxiliary motor is operated, the connecting rod 29 moves from the position shown in Figure 4 to the position shown in Figure 5. This carries the pawl 160 over to the right. It ratchets by one of the stop lugs 164 and then, on the return movement, is brought against this lug so as to swing the disk 116 to a predetermined position, whereupon the pawl passes by the outer edge of this lug. During this swinging movement of the reproducer disk 116, the upper right hand lug 119 of Figure 5 would be brought down to the position of the corresponding lug in Figure 3. This will bring the lug 119 against the arm 118 of the trip switch G, pulling it open as indicated. The retaining pawl 166 prevents the trip switch spring from pulling the disk backward after the pawl 160 is passed by the lug 164.

The parts are timed so that the switch is opened just after the follower 130 has been restored to the inactive position shown in Figure 3.

The actual position at which the mechanism comes to rest will depend upon a number of factors. There will be a variable friction opposing the return movement of the record shifting arm, depending upon the height of the records in the stack and the amount which it is necessary to shift the upper record to bring it against the stops, or there may be no record to be shifted. The temperature of the motor and the friction of the bearings also introduce a variable which makes the actual stopping point of the motor driven mechanism indefinite. There may be an overrun of a considerable amount, but this does not appear to be at all harmful.

The extent of the swinging movement of the reproducer arm may be controlled by suitably placed stops. As shown in Figure 19, the end of the screw 73 engages with the support 94 for the roller arm bracket to limit the movement of the reproducer in one direction. In Figure 3 the dotted lines show the arm 112 as abutting against the head of the screw 130' which supports the follower 130. This prevents the engagement of the reproducer with the center post.

At the completion of the record shifting operation, the stylus has been placed in the playing groove of the record, and the record is played through in the usual manner until the trip switch G is again released, whereupon the mechanism goes through the record shifting cycle, bringing either a ten or a twelve inch record into playing position and depositing the stylus in the record groove. This operation continues as long as there are records to shift. After the last record has been played, the record shifting mechanism is set into operation, but in the absence of a record, the record shifting arm passes through a different path than when shifting a record. The portions 58 and 59 of the cam 55 now control the path of movement of the pickup pin, as indicated in Figure 25 at 58' and 59'. When the record shifting pin passes through this path, it engages the switch F and shifts it from the "on" to the "off" position, thereby stopping the turn table motor. The trip switch G is opened in the usual manner to stop the mechanism.

The phonograph is also provided with devices whereby one can indefinitely repeat a ten inch record or the last record of a selection from a ten inch position. To do this some member moving with the reproducer support is provided with a part which is engageable by a member moving with the record shifting mechanism to push the reproducer support approximately to the ten inch position when no record is shifted. These parts may take the form of lugs 170 and 171, carried on the stamping 78 and 42, respectively, and shown in Figures 15, 16 and 19. The lug 171, moving with the record shifting mechanism, is adapted to engage with the lug 170 to move the reproducer support to approximately the ten inch position. This will take place after the playing of the last record is accomplished, and if one desires to use the phonograph as a repeating phonograph, playing on one record, it is merely necessary to raise the record pickup pin 51 so that it cannot operate the turn table switch F when passing through the record shifting cycle without a record to shift. This may readily be done by looping a rubber band about the pickup pin 51 and arm.

If one should attempt to place too many records on the platform, the stylus will be raised to such a height that the pawl lifting lever 105 will be moved, as indicated in Figure 8, to prevent the pawl 101 from engaging with the ratchet disk 116. Thus this extra record will be played but the record shifting mechanism will not be set into operation. This mechanism functions similarly when one raises the reproducer about the pivot 71 to insert a needle. The moving of the reproducer back and forth will not affect the trip switch.

The molded piece embodying the rear record guide E'' also extends rearwardly, as shown at 173, to form a housing about the center post assembly. It has a central opening 174, large enough to accommodate all these parts, and may be placed on the chassis after the entire mechanism has been assembled and tested, the hole 174 being large enough to allow passing the molded piece by the reproducer D and record shifting arm when these parts are swung up toward the vertical. The reproducer supporting arm moves about in an opening 175 and carries a shield plate 176 to conceal the enclosed apparatus. A turret cover 177 is secured to upwardly extending posts 178, carried by the saddle stamping 42, by screws 179.

I claim:

1. In a phonograph, the combination with a rotatable playing platform adapted to support a plurality of records, and a movable reproducer and stylus cooperative with the grooves in the record and adapted to be moved thereby across the platform, a record magazine, automatic record changing mechanism, record controlled stylus actuated means for automatically setting the record changing mechanism into operation upon completion of the playing of a record to carry out a predetermined cycle of operations wherein records are successively shifted from the magazine to the playing platform and stacked thereon, of means whereby, when said reproducer is moved to a predetermined height above the playing platform, the stylus actuated means is rendered ineffective to set the record changing mechanism into operation.

2. In a phonograph, the combination with a rotatable playing platform adapted to support a plurality of records, and a movable reproducer and stylus cooperative with the grooves in the record and adapted to be moved thereby across the platform, a record magazine, an auxiliary motor, motor-operated automatic record changing mechanism, a stylus actuated switch adapted to be closed upon the completion of the playing of a record for energizing the motor to automatically set the record changing mechanism into operation to carry out a predetermined cycle of operations wherein records are successively shifted from the magazine to the playing platform and stacked thereon and the switch opened, of means whereby, when said reproducer is moved to a predetermined height above the playing platform, the switch is out of the range of the switch closing means whereby the completion of the record fails to set the record changing mechanism into operation.

3. In a phonograph, the combination with a rotatable playing platform adapted to support a plurality of records, and a movable reproducer and stylus cooperative with the grooves in the record and adapted to be moved thereby across the platform, a record magazine, an auxiliary motor, motor-operated automatic record changing mechanism normally automatically set into operation by the closing of a record controlled switch in the circuit thereof upon the completion of the playing of a record to carry out a predetermined cycle of operations wherein records are successively shifted from the magazine to the playing platform and stacked thereon and the switch opened, of means effective, when the reproducer is moved to a predetermined height above the playing platform for preventing the normal closing of the switch so that the record changing mechanism is not set into operation.

4. In a phonograph, the combination with a rotatable playing platform adapted to support a plurality of records, and a movable reproducer support carrying a reproducer and stylus cooperative with the grooves in the record and adapted to be moved thereby across the platform, a record magazine, an automatic record changing mechanism including a switch for controlling the same, said switch having contacts biased toward closed position and normally closed under the control of a record upon completion of the playing of said record to set the record changing mechanism into operation to carry out a predetermined cycle of operations wherein records are successively shifted from the magazine to the playing platform and stacked thereon and the switch opened, and operating means for said switch including a member actuated by the record shifting mechanism to open the switch and hold it open and being operable by the reproducer support under the control of said record for actuating said member to release the switch when the reproducer is at an elevation below a predetermined height and within a predetermined radius of the platform axis.

5. In a phonograph, the combination with a rotatable playing platform adapted to support a plurality of records, and a movable reproducer support carrying a reproducer and stylus cooperative with the grooves in the record and adapted to be moved thereby across the platform, a record magazine, an automatic record changing mechanism including a switch having contacts biased toward closed position and normally closed by the record upon completion of the playing of said record to set the record changing mechanism into operation to carry out a predetermined cycle of operations wherein records are successively shifted from the magazine to the playing platform and stacked thereon and the switch opened, and operating means for said switch including a pivoted member actuated by the record shifting mechanism to open the switch and hold it open and being operable by the reproducer support in cooperation with said record for actuating said member in one direction only to release the switch when the reproducer is at an elevation below a predetermined height and within a predetermined radius of the platform axis.

6. In a phonograph, the combination with a rotatable playing platform adapted to support a plurality of records, and a movable reproducer support carrying a reproducer and stylus cooperative with the grooves in the record and adapted to be moved thereby across the platform, a record magazine, an automatic record changing mechanism including a switch having contacts biased toward closed position and normally closed by the record upon completion of the playing of said record to set the record changing mechanism into operation to carry out a predetermined cycle of operations wherein records are successively shifted from the magazine to the playing platform and stacked thereon and the switch opened, and operating means for said switch including a rotatable member actuated by the record shifting mechanism to a predetermined position to open the switch and hold it open, and including pawl and ratchet means operable by the reproducer support under the control of said record for actuating said member to release the switch when the reproducer is at an elevation below a predetermined height and within a predetermined radius of the platform axis, the pawl being held away from the ratchet when the reproducer is above a predetermined elevation.

7. In a phonograph, the combination with a rotatable playing platform adapted to support a plurality of records, and a movable reproducer support carrying a reproducer and stylus cooperative with the grooves in the record and adapted to be moved thereby across the platform, a record magazine, an automatic record changing mechanism including a switch having contacts biased toward closed position and normally closed by the record upon completion of the playing of a record to set the record changing mechanism into operation to carry out a predetermined cycle of operations wherein records are successively shifted from the magazine to the playing platform and stacked thereon and the switch opened, and operating means for said switch including a rotatable member actuated by the record shifting mechanism to a predetermined position to open the switch and hold it open and including ratchet and pawl means operable by the reproducer support in cooperation with said record for actuating said member to release the switch when the reproducer is at an elevation below a predetermined height and the reproducer is oscillated back and forth after being brought within a predetermined radius of the platform axis.

8. In a phonograph, the combination with a rotatable playing platform adapted to support a plurality of records, and a movable reproducer support carrying a reproducer and stylus cooperative with the grooves in the record and adapted to be moved thereby across the platform, a record magazine, an automatic record changing mechanism including a switch having contacts biased toward closed position and normally closed by the record upon completion of the playing of said record to set the record changing mechanism into operation to carry out a predetermined cycle of operations wherein records are successively shifted from the magazine to the playing platform and stacked thereon and the switch opened, operating means for said switch including a rotatable member having ratchet teeth and actuated by the record shifting mechanism to a predetermined position to open the switch and hold it open, a pawl swinging with the reproducer support under the control of said record and cooperating with the ratchet teeth for actuating said member to release the switch, and a pawl lifter acting when the reproducer is above a predetermined height to hold the pawl off the ratchet.

9. In a multiple record phonograph, a reproducer support mounted to swing about a vertical axis and pivoted on a horizontal axis so that the reproducer carried thereby may cooperate with the groove of a record on a rotating playing platform, record shifting mechanism for moving records onto the platform, a switch for controlling the starting of the record shifting mechanism, and means whereby said switch is normally closed by the reproducer support when moved within a predetermined radius of the axis of the playing platform by the record grooves, said means including connections for effecting the closing of the switch which are rendered nonfunctioning when the reproducer support is elevated above a predetermined height.

10. In a multiple record phonograph, a reproducer support mounted to swing about a vertical axis and pivoted on a horizontal axis so that the reproducer carried thereby may cooperate with the groove of the uppermost record on a rotating playing platform, the reproducer support being horizontally jointed so that the reproducer may be raised away from the records a substantial distance to facilitate insertion of a needle into the reproducer, record shifting mechanism for stacking records onto the platform, a switch for controlling the starting of the record shifting mechanism, and means whereby said switch is normally closed by the reproducer support when moved within a predetermined radius of the axis of the playing platform by the record grooves, said means including connections for effecting the closing of the switch which are rendered non-functioning when the reproducer support is raised to a predetermined height for needle insertion.

11. In a multiple record phonograph, a reproducer support mounted to swing about a vertical axis and pivoted on a horizontal axis so that the reproducer carried thereby may cooperate with the groove of a record on a rotating playing platform, electrically operated record shifting mechanism for moving records onto the platform, the reproducer being balanced by a counterweight swinging with the reproducer support, the reproducer support being horizontally jointed so that the reproducer may be raised away from the records a substantial distance to facilitate insertion of a needle into the reproducer, a switch for controlling the starting of the record shifting mechanism, and means whereby said switch is normally closed by the reproducer support when moved within a predetermined radius of the axis of the playing platform by the record grooves, said means including connections for effecting the closing of the switch which are rendered non-functioning when the reproducer is manually raised above a predetermined height.

12. In a multiple record phonograph, a reproducer support mounted to swing about a vertical axis and pivoted on a horizontal axis so that the reproducer carried thereby may cooperate with the groove of the uppermost record on a rotating playing platform electrically operated, record shifting mechanism for stacking records onto the platform, a switch for controlling the starting of the record shifting mechanism, means whereby said switch is normally closed by the reproducer support when moved within a predetermined radius of the axis of the playing platform by the record grooves, ratchet and pawl connections included in the means for effecting the closing of the switch, and means for raising the pawl off the ratchet when the reproducer is above a predetermined height.

13. In a multiple record phonograph, a reproducer support mounted to swing about a vertical axis and pivoted on a horizontal axis so that the reproducer carried thereby may cooperate with the groove of a record on a rotating playing platform, electrically operated record shifting mechanism for moving records onto the platform, a switch for controlling the starting of the record shifting mechanism, a movable ratchet plate for releasing the switch, a ratched movable with the reproducer support and engageable with the plate during a predetermined range of movement of the reproducer support whereby the switch is normally closed by the reproducer support when moved within a predetermined radius of the axis of the playing platform by the record grooves, and a pawl lifter to hold the pawl off the ratchet when the reproducer support is elevated above a predetermined height.

14. In a multiple record phonograph, a reproducer support mounted to swing about a vertical axis and pivoted horizontally so that the reproducer carried thereby may cooperate with the grooves of the uppermost record on a rotating playing platform, electrically operated record shifting mechanism for stacking records on the platform, a disk carried about the vertical axis of the reproducer support, disk presetting means carried by the record shifting mechanism for placing the disk in a predetermined position at the end of the record shifting cycle, a trip switch for controlling the record shifting mechanism, the switch being opened by the disk and held open thereby, and reproducer-support-operated one-way driving means for turning the disk on its axis to release the trip switch at the end of a record or when the reproducer is manually moved to tripping position.

15. In a multiple record phonograph, a reproducer support mounted to swing about a vertical axis and pivoted horizontally so that the reproducer carried thereby may cooperate with the grooves of the uppermost record on a rotating playing platform, electrically operated record shifting mechanism for stacking records on the platform, a disk free to rotate in one direction about the vertical axis of the reproducer support and having ratchet teeth, disk presetting means carried by the record shifting mechanism for placing the disk in a predetermined position at the end of the record shifting cycle, a trip switch for controlling the record shifting mechanism, the switch being opened by the disk and held open thereby, and a reproducer-support-operated pawl for turning the disk on its axis to release the trip switch at the end of a record or when the reproducer is manually moved to tripping position.

16. In a multiple record phonograph, a reproducer support mounted to swing about a vertical axis and pivoted horizontally so that the reproducer carried thereby may cooperate with the grooves of the uppermost record on a rotating playing platform, electrically operated record shifting mechanism for stacking records on the platform, a disk free to rotate in one direction about the vertical axis of the reproducer support and having ratchet teeth, disk presetting means carried by the record shifting mechanism for placing the disk in a predetermined position at the end of the record shifting cycle, a trip switch for controlling the record shifting mechanism, the switch being opened by the disk and held open thereby, a reproducer-support-operated pawl for turning the disk on its axis to release the trip switch at the end of a record or when the reproducer is manually moved to tripping position, and a stationary plate for holding the pawl off the disk when the reproducer is beyond a predetermined distance from the axis of the playing platform.

17. In a multiple record phonograph, a reproducer support mounted to swing about a vertical axis and pivoted horizontally so that the reproducer carried thereby may cooperate with the grooves of the uppermost record on a rotating playing platform, electrically operated record shifting mechanism for stacking records on the platform, said record shifting mechanism including an oscillatory shaft concentric with the reproducer support, a disk carried about the vertical axis of the reproducer support, a disk presetting pawl movable with the oscillatory shaft, record shifting mechanism for placing the disk in a predetermined position at the end of the record shifting cycle and then passing beyond the disk so that the disk is free to move, a trip switch for controlling the record shifting mechanism, the switch being opened by the disk and held open thereby, and reproducer-support-operated one-way driving means for turning the disk on its axis to release the trip switch at the end of a record or when the reproducer is manually moved to tripping position.

18. In a multiple record phonograph, a reproducer support mounted to swing about a vertical axis and pivoted horizontally so that the reproducer carried thereby may cooperate with the grooves of the uppermost record on a rotating playing platform, electrically operated record shifting mechanism for stacking records on the platform, a trip switch for controlling the record shifting mechanism, a trip switch operating device about the vertical axis of the reproducer support, presetting means therefor carried by the record shifting mechanism for placing the device in a predetermined position at the end of the record shifting cycle to open the trip switch, and reproducer-support-operated one-way driving means for turning the device on its axis to release the trip switch at the end of a record or when the reproducer is manually moved to tripping position.

19. In a multiple record phonograph, a ratchet disk pivoted concentrically with a reproducer support, electrically operated record shifting mechanism including means to preset the ratchet disk in predetermined position at the end of a record shifting cycle, a trip switch for controlling the record shifting mechanism, the switch being opened by the disk and held open thereby, and a pawl carried by the reproducer support and normally engageable with ratchet teeth on the disk through a predetermined range of swinging movement of the reproducer support for actuating the disk to a position to release the trip switch.

20. In a multiple record phonograph, a ratchet disk pivoted concentrically with a reproducer support, electrically operated record shifting mechanism including means to preset the ratchet disk in predetermined position at the end of a record shifting cycle, a trip switch for controlling the record shifting mechanism, the switch being opened by the disk and held open thereby, a pawl carried by the reproducer support and normally engageable with ratchet teeth on the disk through a predetermined range of swinging movement of the reproducer support for actuating the disk to a position to release the trip switch, and a pawl lifter carried by the reproducer support for disengaging the pawl from the ratchet disk.

21. In a multiple record phonograph, a ratchet disk pivoted concentrically with a reproducer support and having lugs, electrically operated record shifting mechanism including a pawl engageable with a lug to preset the ratchet disk in predetermined position at the end of a record shifting cycle, a trip switch for controlling the record shifting mechanism, the switch being opened by the disk and held open thereby, and a second pawl carried by the reproducer support and normally engageable with ratchet teeth on the disk through a predetermined range of swinging movement of the reproducer support for actuating the disk to a position to release the trip switch.

22. In a multiple record phonograph, a ratchet disk pivoted concentrically with a reproducer support, the disk having a plurality of downwardly extending, regularly spaced placement lugs, an equal number of switch operating lugs, and an equal number of ratchet toothed sections at its edge, electrically operated record shifting mechanism including an oscillatory pawl engageable with the placement lugs to preset the ratchet disk in a predetermined position at the end of a record shifting cycle, a trip switch for controlling the record shifting mechanism, the switch being opened by the switch operating lug and held open thereby, a retaining pawl engageable with one section of ratchet teeth to prevent retrograde movement of the disk, and a pawl carried by the reproducer support and normally engageable with ratchet teeth on the edge of the disk through a predetermined range of swinging movement of the reproducer support for actuating the disk to move the switch operating lug to release the trip switch.

23. In a multiple record phonograph, a ratchet disk pivoted concentrically with a reproducer support, the disk having a plurality of downwardly extending, regularly spaced placement lugs, an equal number of switch operating lugs, and an equal number of ratchet toothed sections at its edge, electrically operated record shifting mechanism including an oscillatory pawl engageable with the placement lugs to preset the ratchet disk in a predetermined position at the end of a record shifting cycle, a trip switch for controlling the record shifting mechanism, the switch being opened by the switch operating lug and held open thereby, a retaining pawl engageable with one section of ratchet teeth to prevent retrograde movement of the disk, a pawl carried by the reproducer support and normally engageable with ratchet teeth on the edge of the disk through a predetermined range of swinging movement of the reproducer support for actuating the disk to move the switch operating lug to release the trip switch, a reproducer carried by the reproducer support to swing therewith and horizontally jointed with respect thereto so that it may raise or lower, and a pawl lifter actuated by the reproducer, when raised beyond a predetermined height, for lifting the last mentioned pawl off the ratchet disk.

24. In a phonograph for successively playing a repertoire of various sized records from a record magazine, record shifting means for shifting the records one at a time from the magazine to a playing platform and for causing the edge of the record while being shifted to automatically preset the reproducer to a new initial position for such record shifted in accordance with the diameter thereof and with the stylus beyond the edge of said record and at a higher elevation than the record placed on the platform, means under the control of the record shifting means for lowering the stylus, simultaneously acting relatively powerful means for moving the stylus inwardly to place it on the upper surface of the record beyond the playing grooves, and relatively weak means for thereafter imparting to the stylus a sudden inward movement to cause it to enter the record groove without moving the stylus out of the groove once it has entered it.

25. In a phonograph for successively playing a repertoire of various sized records from a record magazine, record shifting means for shifting the records one at a time from the magazine to a playing platform and for causing the edge of the record while being shifted to automatically preset the reproducer to a new initial position for such record shifted in accordance with the diameter thereof and with the stylus beyond the edge of said record and at a higher elevation than the record placed on the platform, means under the control of the record shifting means for lowering the stylus, simultaneously acting relatively powerful means including a cam and follower acted on by a strong spring for moving the stylus inwardly to place it on the upper surface of the record beyond the playing grooves, and a relatively weak spring acting on the follower for thereafter imparting to the stylus a sudden inward movement to cause it to enter the record groove without moving the stylus out of the groove once it has entered it.

26. In a phonograph for successively playing a repertoire of various sized records from a record magazine, record shifting means for shifting the records one at a time from the magazine to a playing platform and for causing the reproducer to be preset to a new initial position for such record shifted in accordance with the diameter thereof and with the stylus beyond the edge of said record and at a higher elevation than the record placed on the platform, means operative after the record has been shifted for lowering the stylus, simultaneously acting relatively powerful means for moving the stylus inwardly to place it on the upper surface of the record beyond the playing grooves, and relatively weak means for thereafter imparting to the stylus a sudden inward movement to cause it to enter the record groove without moving the stylus out of the groove once it has entered it.

27. In a phonograph for successively playing a repertoire of records from a record magazine, record shifting means for shifting the records one at a time from the magazine to a playing platform and for locating the reproducer in preplaying position with the stylus beyond the edge of the record and at a higher elevation than the record placed on the platform, means operative after the record has been shifted for lowering the stylus, simultaneously acting relatively powerful means for moving the stylus inwardly to place it on the upper surface of the record beyond the playing grooves, and relatively weak means for thereafter imparting to the stylus a sudden inward movement to cause it to enter the record groove without moving the stylus out of the groove once it has entered it, said weak means being normally unrelated to said stylus.

28. In a phonograph for successively playing a repertoire of records from a record magazine, record shifting means for shifting the records one at a time from the magazine to a playing platform and for locating the reproducer in preplaying position with the stylus beyond the edge of the record and at a higher elevation than the record placed on the platform, means operative after the record has been shifted for lowering the stylus, simultaneously acting relatively powerful means including a cam and follower acted on by a strong spring for moving the stylus inwardly to place it on the upper surface of the record beyond the playing grooves, and a relatively weak spring acting on the follower for thereafter imparting to the stylus a sudden inward movement to cause it to enter the record groove without moving the stylus out of the groove once it has entered it, said weak means being normally unrelated to said stylus.

29. The combination with record shifting mechanism and a movable reproducer actuated thereby during record shifting to a position in accordance with the diameter of the record being shifted and held suspended above the record and with its stylus beyond the edge of the record, of reproducer lowering means and stylus placing means comprising a two-step cam actuated by the record shifting mechanism and a follower, the follower having reproducer placing elements automatically selected by the shifting of the record and acting in two steps, in which the reproducer and stylus are first positively shifted in to an intermediate position above the margin of the record and are then given a sudden inward impulse sufficient to move the stylus into the record grooves but insufficient to move the stylus out of the record groove it has entered.

30. The combination with record shifting mechanism and a movable reproducer actuated thereby during record shifting to one of several selectable positions controlled by the diameter of the record being shifted and held suspended above the record and with its stylus beyond the edge of the record, of reproducer lowering means and stylus placing means actuated by the record shifting mechanism after the record is shifted, said stylus placing means comprising a cam and a spring pressed follower normally held in position such that the reproducer may freely swing, the cam, spring and follower functioning to first positively shift the reproducer and stylus inwardly to an intermediate position above the margin of the record and to then give them a sudden inward impulse sufficient to move the stylus into the record grooves but insufficient to move the stylus out of the record groove it has entered.

31. The combination with record shifting mechanism, a movable reproducer, and reproducer locating means acting to position the reproducer into one of several selectable pre-playing positions controlled by the diameter of the record being shifted and to suspend it above the record and with its stylus beyond the edge of the record, of reproducer lowering means and stylus placing means actuated by the record shifting mechanism after the record is shifted, said stylus placing means comprising a cam and a spring pressed follower normally held in position such that the reproducer may freely swing, the cam, spring and follower functioning to first positively shift the reproducer and stylus inwardly to an intermediate position above the margin of the record and to then give them a sudden inward impulse sufficient to move the stylus into the record grooves but insufficient to move the stylus out of the record groove it has entered.

32. In a multiple record phonograph, a swinging reproducer support carrying a reproducer and stylus, record shifting mechanism for shifting records of various sizes and for placing the reproducer support in a selected position according to the size of the record being shifted, a member movable with the reproducer support, a cam operated by the record shifting mechanism, a follower for the cam, and camming surfaces carried by the follower and acting on the member movable with the reproducer support for shifting the reproducer support inwardly for placing the stylus on the record, said camming surfaces corresponding to different sizes of records.

33. In a multiple record phonograph, a swinging reproducer support carrying a reproducer and stylus, record shifting mechanism for shifting records of various sizes and for placing the reproducer support in a selected position according to the size of the record being shifted, a member movable with the reproducer support, a cam operated by the record shifting mechanism, a followed for the cam, camming surfaces carried by the follower and corresponding in position with various sizes of record, the member movable with the reproducer support being positioned adjacent a selected camming surface, a strong spring acting on the follower to bring the camming surface into engagement with the member to shift the reproducer support inwardly a predetermined amount when one part of the cam is acting on the follower, and a weak spring for shifting the reproducer support inwardly when the cam moves farther.

34. In a multiple record phonograph, a swinging reproducer support carrying a reproducer and stylus, record shifting mechanism for shifting records of various sizes and for placing the reproducer support in a selected position according to the size of the record being shifted, a member movable with the reproducer support, a cam operated by the record shifting mechanism, a spring pressed follower for the cam, a portion of the cam allowing the follower to be brought against the member to provide friction to oppose reproducer movement, another portion of the cam allowing the follower to move after the record is placed in playing position, and camming surfaces carried by the follower and acting on the member movable with the reproducer support for shifting the reproducer support inwardly for placing the stylus on a record.

35. In a multiple record phonograph, a swinging reproducer support carrying a reproducer and stylus, record shifting mechanism for shifting records of various sizes and for placing the reproducer support in a selected position according to the size of the record being shifted, a member movable with the reproducer support, a cam operated one revolution by the record shifting mechanism, a bell crank shaped follower for the cam, the follower having camming surfaces adjacent the member when the reproducer support is positioned by the record, relatively strong and weak springs having different ranges of action and acting on the follower so that the follower, when released by the cam, may act on the member movable with the reproducer support for shifting the reproducer support inwardly in two steps to place the stylus in the record groove, the weaker spring effecting the latter portion of the movement.

36. In a multiple record phonograph, a swinging reproducer support carrying a reproducer and stylus, record shifting mechanism for shifting records of various sizes and for placing the reproducer support in a selected position controlled by the size of the record being shifted, a member movable with the reproducer support, a cam operated by the record shifting mechanism, a spring pressed follower for the cam, the cam and follower acting on the member normally permitting free movement of the reproducer support but during the early part of the record shifting cycle to provide a friction check to the movement of the reproducer support and after the record is deposited to move the reproducer support for shifting the reproducer support inwardly to place the stylus in a record groove.

37. In a phonograph, stylus placing means comprising a member partaking of the swinging movement of the reproducer which carries the stylus, a movable cam, a reproducer locating follower bearing on the cam, dual spring means for pressing the follower against the cam, the cam normally holding the follower away from the member whereby the reproducer swings freely, the cam having a cam surface against which the follower is brought by both spring means to shift the follower a predetermined amount to bring it against the member swinging with the reproducer so that the stylus is shifted inwardly to a predetermined position, and a stop limiting the action of one of the spring means, the cam having a short gap adjacent said surfaces for allowing the other spring means to gently act on the follower to urge the reproducer inwardly, the cam then withdrawing the follower from the member.

38. In a multiple record phonograph, stylus placing means comprising a member partaking of the swinging movement of the reproducer which carries the stylus, a movable cam, a follower for the cam, the follower having notches in front of which the member is placed before the record is placed in playing position, the notch selected corresponding with the size of the record, dual spring means for pressing the follower against the cam, the cam normally holding the follower away from the member whereby the reproducer swings freely, the cam having a cam surface against which the follower is brought by both spring means to shift the follower a predetermined amount to bring the notched wall against the member to swing the stylus inwardly to a predetermined position, and a stop limiting the action of one of the spring means, the cam having a short gap adjacent said surface for allowing the other spring means to gently act on the follower to urge the reproducer inwardly, the cam then withdrawing the follower from the member.

39. In a multiple record phonograph having record shifting mechanism for shifting records of various sizes and placing the reproducer support in a selected position according to the size of the record shifted, a member movable with the reproducer, a cam operated by the record shifting mechanism, a cooperative follower, dual spring means acting on the follower, the cam normally holding the follower in idle position with respect to the member movable with reproducer, the follower having notches opposite which the member is positioned by the record shifting mechanism, the cam first releasing the follower to allow both spring means to move the follower to bring the wall of the notch corresponding with the record shifted against the member to shift the stylus inwardly to be above the record, and a stop limiting the action of one of the spring means, the cam then releasing the follower and allowing the other spring only to urge the stylus inwardly, the cam then withdrawing the follower from the member.

40. In a multiple record phonograph having record shifting mechanism for shifting records of various sizes and placing the reproducer support in a selected position according to the size of the record shifted, a member movable with the reproducer, a plate cam operated by the record shifting mechanism, a cooperative bell-crank follower, dual spring means acting on the follower holding it against the edge of the plate, the cam normally holding the follower in idle position with respect to the member movable with the reproducer, the follower having notches opposite which the member is positioned by the record shifting mechanism, the cam plate having a cutout which releases the follower to allow both spring means to move the follower to bring the notch corresponding with the record shifted against the member to shift the stylus inwardly to be above the record, and a stop limiting the action of one of the spring means, the cam plate having a gap which releases the follower and allows the other spring only to urge the stylus inwardly, the cam plate then withdrawing the follower from the member.

41. In a multiple record phonograph, a stylus setting device comprising a member movable with the reproducer, a movable cam and cooperative follower urged against the cam by a strong spring having a limited range of action and by a weak spring, the follower having camming surfaces corresponding to the different sizes of records to be played, the member being located adjacent one of said surfaces when the reproducer is brought to a pre-playing position in accordance with the size of the record to be played, the cam first releasing the follower so that both springs may positively urge the reproducer inwardly, and then so that the weaker spring only may act in the position to shift the reproducer inwardly additionally.

42. In a multiple record phonograph, a stylus setting device comprising a member movable with the reproducer, a movable cam and cooperative follower urged against the cam by a strong spring having a limited range of action and by a weak spring, the follower having camming surfaces corresponding to the different sizes of records to be played, the member being located adjacent one of said surfaces when the reproducer is brought to a pre-playing position in accordance with the size of the record to be played, the cam first releasing the follower so that both springs may positively urge the reproducer inwardly, and then so that the weaker spring only may act in the position to shift the reproducer inwardly additionally, the cam then withdrawing the follower so as not to interfere with reproducer movement.

43. In a multiple record phonograph, a reproducer and stylus, a movable cam and a follower under the influence of a strong spring having a range of action corresponding with one of several selectable movements allowed the follower by the cam and of a weaker spring having a greater range of action, a member swinging with the reproducer and placed in one of several selectable positions relative to the follower during record shifting, the position of said member being selected under the control of the record being shifted, the follower being engageable with the member during said first movement to positively shift the reproducer to a predetermined position and to further urge it under the influence of the weak spring whereby the stylus is brought into the record groove.

44. In a multiple record phonograph, a reproducer and stylus, a movable plate cam and a bellcrank follower under the influence of a strong spring having a range of action corresponding with one of the movements allowed the follower by the cam and of a weaker spring having a greater range of action, a member swinging with the reproducer and placed in a selected position relative to the follower during record shifting, the follower having camming surfaces corresponding to different sizes of records to be played and engageable with the member during said first movement to positively shift the reproducer to a position determined by the size of the shifted record and to further urge it under the influence of the weak spring whereby the stylus is brought into the record groove, the cam then withdrawing the follower so as not to interfere with reproducer movement.

45. In a multiple record phonograph, a reproducer and stylus, a movable plate cam and a bell-crank follower under the influence of a strong spring having a range of action corresponding with one of the movements allowed the follower by the cam and of a weaker spring having a greater range of action, a member swinging with the reproducer, means for placing it in one position relative to the follower during the record shifting cycle and in one of a plurality of selected positions relative to the follower at the end of the record shifting cycle, the cam acting on the follower when the member is in the first mentioned position to cause it to impose friction on the member to oppose its movement, the follower having camming surfaces engageable with the member when in one of the selected positions during said first movement to positively shift the reproducer to a predetermined position and to further urge it under the influence of the weaker spring whereby the stylus is brought into the record groove, the cam then withdrawing the follower so as not to interfere with reproducer movement.

46. A phonograph having a continuously rotating playing platform for playing records, a reproducer and stylus cooperative with the grooves in the record on the platform, a magazine for records of various sizes, and automatic record changing mechanism automatically set into operation upon completion of the playing of a record to carry out a predetermined cycle of operations, wherein records are successively shifted from the magazine to the playing platform, said record changing mechanism including means for bringing the edge of the record being transferred against a member moving with the reproducer to preset the stylus in accordance with the diameter of the record to be placed on the playing platform, and means acting on the reproducer support after the record is deposited on the platform to shift the stylus inwardly in two steps.

47. In a multiple record phonograph wherein records are shifted, means for shifting the reproducer to a predetermined position adjacent the axis of the playing platform during record shifting, comprising an arm swinging with the reproducer and a horizontal rotary disk carried by the record shifting mechanism and carrying a pin engageable with the arm during a part only of the record shifting cycle.

48. In a multiple record phonograph having a record magazine, a playing platform, a movable reproducer support carrying a reproducer adapted to swing above the playing platform, automatic record shifting mechanism for shifting records from the magazine to the platform, and means for shifting the reproducer to a predetermined position adjacent the axis of the playing platform to meet a record being shifted to the platform, said means comprising a horizontal disk rotated one revolution by the record shifting mechanism during the record shifting cycle and carrying a pin extending upwardly and an arm movable with the reproducer support and engageable with the pin.

49. In a multiple record phonograph having a record magazine, a playing platform, a movable reproducer support carrying a reproducer adapted to swing above the playing platform, automatic record shifting mechanism for shifting records from the magazine to the platform, means for raising the reproducer to a predetermined elevation above the playing platform, and means for shifting the reproducer to a predetermined position adjacent the axis of the playing platform to meet a record being shifted to the platform, said means comprising a member rotated one revolution by the record shifting mechanism during the record shifting cycle and an arm movable with the reproducer support and engageable with the rotatable member.

50. In a multiple record phonograph, a record shifting mechanism including a one revolution shaft carried below and to one side of the axis of a swinging reproducer supporting arm carrying an extension in the path of a member rotated by the one revolution shaft, the member engaging the extension to position the reproducer supporting arm adjacent the axis of the playing platform and passing beyond the extension so as not to interfere with reproducer movement.

51. In a multiple record phonograph, a record shifting mechanism including a one revolution shaft carrying a cam and a pin below and to one side of the axis of a swinging reproducer supporting arm carrying an extension in the path of the pin, the pin engaging the extension to position the reproducer supporting arm adjacent the axis of the playing platform, and a follower for the cam engageable with the extension during a portion of the movement of the reproducer supporting arm for applying friction to oppose such movement.

52. In a multiple record phonograph, a reproducer, record shifting mechanism, means actuated thereby for shifting the reproducer to a predetermined position adjacent the axis of the playing platform to meet and to engage a record being shifted, and means operated by the record shifting mechanism, after the reproducer has been shifted in, for temporarily engaging a member movable with the reproducer to apply friction to resist the movement of the reproducer outwardly.

53. In a multiple record phonograph, a reproducer, record shifting mechanism, means actuated thereby for shifting the reproducer to a predetermined position adjacent the axis of the playing platform to meet and to engage a record being shifted, and a cam and follower operated by the record shifting mechanism, after the reproducer has been shifted in, for temporarily engaging a member movable with the reproducer to apply friction to resist the movement of the reproducer outwardly.

54. In a multiple record phonograph, record shifting mechanism, means actuated thereby for shifting the reproducer to a predetermined position adjacent the axis of the playing platform to meet a record being shifted, and means operated by the record shifting mechanism, after the reproducer has been shifted in, for temporarily engaging a member movable with the reproducer to apply friction to resist the movement of the reproducer outwardly, the last mentioned means acting, after the record has been shifted, to place the stylus of the reproducer in playing position on the record.

55. In a multiple record phonograph, record shifting mechanism, means actuated thereby for shifting the reproducer to a predetermined position adjacent the axis of the playing platform to meet a record being shifted, the reproducer being then pushed outwardly to a position determined by the size of the record being shifted, and a cam and spring controlled follower operated by the record shifting mechanism, after the reproducer has been shifted in, for temporarily engaging a member movable with the reproducer to apply friction to resist the movement of the reproducer outwardly, the follower acting, after the reproducer has been positioned, to bring the follower against the member movable with the reproducer to shift the stylus of the reproducer into the playing groove.

56. In a multiple record phonograph, record shifting mechanism, a stylus placing mechanism including a movable member actuated by the record shifting mechanism after the record is shifted, and a reproducer support movable during record shifting to a position controlled by the size of the record being shifted and having a member movable therewith and placed adjacent a camming surface on the first movable member, said second member cooperating with said first member to shift the stylus inwardly in accordance with said adjacent camming surface to place it in the playing groove.

57. In a multiple record phonograph, record shifting mechanism, a stylus placing mechanism for placing the stylus in the playing groove of either of two sizes of records, including a movable member actuated by the record shifting mechanism after the record is shifted, and a reproducer support movable during record shifting to one of two positions controlled by the size of the record being shifted and having a member movable therewith and placed adjacent one or the other of two camming surfaces on the first movable member, said second member cooperating with the first member to shift the stylus inwardly in accordance with said adjacent camming surface to place it in the playing groove.

58. In a multiple record phonograph, record shifting mechanism, a stylus placing mechanism for placing the stylus in the playing grooves of various sizes of records, including a movable member actuated by the record shifting mechanism after the record is shifted and a reproducer support movable during record shifting to a position determined by the size of the record being shifted and having a member movable therewith and placed adjacent one of several notches on the first movable member corresponding in number with the number of sizes of records, said movable member cooperating with said first member to shift the stylus inwardly in accordance with the adjacent notch to place it in the playing groove.

59. In a multiple record phonograph, record shifting mechanism, a stylus placing mechanism including a movable member actuated by the record shifting mechanism after the record is shifted and a reproducer support movable during record shifting to a position determined by the size of the record being shifted and having a member movable therewith and placed in front of either of two V-shaped notches in the first movable member, the movement of the first movable member then bringing the side of the notch against the second movable member to shift the stylus inwardly to place it in the playing groove.

60. In a multiple record phonograph, record shifting mechanism, a stylus placing mechanism including a movable member actuated by the record shifting mechanism after the record is shifted, a reproducer support movable during record shifting to a position determined by the size of the record being shifted and having a member movable therewith and placed in front of either of two V-shaped notches in the first movable member, the movement of the first movable member then bringing the side of the notch against the second movable member to shift the stylus inwardly to place it in the playing groove, and means for applying graduated forces on the first member so that the last movement of the stylus is with insufficient force to cause the stylus to cross the grooves of the playing surface.

61. In a multiple record phonograph in combination, a playing platform adapted to support records, a movable reproducer and stylus cooperative with the grooves in the record and adapted to be moved thereby across the platform, a record magazine, record shifting mechanism for shifting records one at a time from the magazine onto the playing platform and including mechanism for placing the reproducer at a predetermined elevation above the platform and at a predetermined distance from the axis of the platform to meet a record being shifted, and for subsequently shifting the reproducer to a preplaying position according to the diameter of the record being shifted and for lowering the reproducer and stylus, and dually functioning cam and follower mechanism for applying friction to oppose movement of the reproducer when moved near the axis of the playing platform during record shifting and for shifting the stylus inwardly into the playing grooves of the record when the reproducer is lowered onto the record, the cam then acting to withdraw the follower so that the reproducer may swing horizontally without restraint.

62. In a multiple record phonograph in combination, a playing platform adapted to support records, a movable reproducer and stylus cooperative with the grooves in the record and adapted to be moved thereby across the platform, a record magazine, a motor, motor operated record shifting mechanism for shifting records one at a time from the magazine onto the playing platform and including mechanism for placing the reproducer at a predetermined elevation above the platform and at a predetermined distance from the axis of the platform to meet a record being shifted, and for subsequently shifting the reproducer to a preplaying position according to the diameter of the record being shifted and for lowering the reproducer and stylus, dually functioning cam and follower mechanism for applying friction to oppose movement of the reproducer when moved near the axis of the playing platform during record shifting and for shifting the stylus inwardly into the playing grooves of the record when the reproducer is lowered onto the record, the cam then acting to withdraw the follower so that the reproducer may swing horizontally without restraint, and a switch in the motor circuit opened by the record shifting mechanism after the cam has withdrawn the follower.

63. In a multiple record phonograph in combination, a playing platform adapted to support records, a movable reproducer and stylus cooperative with the grooves in the record and adapted to be moved thereby across the platform, a record magazine, record shifting mechanism for shifting records one at a time from the magazine onto the playing platform and including mechanism for placing the reproducer at a predetermined elevation above the platform and at a predetermined distance from the axis of the platform to meet a record being shifted, and for subsequently shifting the reproducer to a preplaying position according to the diameter of the record being shifted and for lowering the reproducer and stylus, a plate cam having two notches and a follower cooperative with one notch on the cam for applying friction to oppose movement of the reproducer when moved near the axis of the playing platform during record shifting and with another notch on the cam for shifting the stylus inwardly into the playing grooves of the record when the reproducer is lowered onto the record, the cam then acting to withdraw the follower so that the reproducer may swing horizontally without restraint.

64. In a phonograph having means for successively playing a repertoire of records from a record magazine wherein they are stacked on top of one another, said means including record shifting mechanism comprising an oscillatory vertical shaft mounted in a fixed bearing and disposed between the magazine and playing platform, a horizontally swingable, record shifting arm provided with a record engaging device and movable by the shaft to carry the device from the magazine to the center of the playing platform and shift a record, and operating connections between the arm and shaft including an eccentrically located bearing carried by the shaft and having a horizontal pivotal connection with the arm, the bearing being on the side of the shaft axis opposite the record engaging device.

65. In a phonograph having means for successively playing a repertoire of records from a record magazine wherein they are stacked on top of one another, said means including record shifting mechanism comprising an oscillatory vertical shaft mounted in a fixed bearing and disposed between the magazine and playing platform a horizontally swingable record shifting arm provided with a record engaging device and movable by the shaft to carry the device from the magazine to the center of the playing platform and shift a record, and operating connections between the arm and shaft including an eccentrically located bearing carried by the shaft and having a horizontal pivotal connection with the arm, the bearing being on the side of the shaft axis opposite the record engaging device, the arm normally extending across the upper end of the shaft but being capable of being swung upwardly to be in approximate parallelism with the shaft.

66. A multiple record phonograph having a magazine for supporting a stack of records, a playing platform, and record shifting means for shifting records from the magazine to the playing platform, said means including a horizontally swingable record shifting arm mounted on a vertical axis and jointed on a horizontal axis to permit it to lower onto the upper record in the magazine, said horizontal axis being above the level of the magazine and on the side of the vertical axis opposite the magazine.

67. In a multiple record phonograph, an oscillatory vertical shaft carried in a fixed bearing, a short arm nonrotatably secured thereto and having upwardly and rearwardly extending bifurcations, a record shifting arm pivotally secured to the bifurcations to raise and lower about a horizontal axis, the record shifting arm extending forwardly across the upper end of the shaft and being provided with a record engaging device at the end thereof.

68. In a multiple record phonograph, an oscillatory vertical shaft carried in a fixed bearing, a short arm nonrotatably secured thereto and having upwardly and rearwardly extending bifurcations, a record shifting arm pivotally secured to the bifurcations to raise and lower about a horizontal axis, the record shifting arm extending forwardly across the upper end of the shaft and being provided with a record engaging device at the end thereof, a reproducer supporting ring about the bearing, a reproducer support jointed to the ring to swing about the bearing, a reproducer at the outer end of the reproducer support and a balance arm at the other end, the joint permitting the reproducer to raise and lower, and shaft operated cam mechanism acting on the balance arm to depress the same and raise the reproducer.

69. In a multiple record phonograph, an oscillatory vertical shaft carried in a fixed bearing a short arm nonrotatably secured thereto and extending upwardly and rearwardly, a record shifting arm pivotally secured to the short arm to raise and lower about a horizontal axis, the record shifting arm extending forwardly across the upper end of the shaft and being provided with a record engaging device at the end thereof, a reproducer supporting ring about the bearing, a reproducer support jointed to the ring to swing about the bearing, a reproducer at the outer end of the reproducer support and a balance arm at the other end, the joint permitting the reproducer to raise and lower, a movable cam carried by the shaft and disposed above the balance arm, and a follower for the cam pivotally secured to the bearing and acting on the balance arm to depress the same and raise the reproducer.

70. In a multiple record phonograph, an oscillatory vertical shaft carried in a fixed bearing, a short arm nonrotatably secured thereto and having upwardly and rearwardly extending bifurcations, a record shifting arm pivotally secured to the bifurcations to raise and lower about a horizontal axis, the record shifting arm extending forwardly across the upper end of the shaft and being provided with a record engaging device at the end thereof, a reproducer supporting ring about the bearing, a reproducer support jointed to the ring to swing about the bearing, a reproducer at the outer end of the reproducer support and a balance arm at the other end, the joint permitting the reproducer to raise and lower, a movable cam carried by the shaft and disposed above the balance arm, and a follower for the cam pivotally secured to the bearing and acting on the balance arm to depress the same and raise the reproducer.

71. In a multiple record phonograph, an oscillatory vertical shaft carried in a fixed bearing, a record shifting arm carried thereby, a reproducer supporting ring about the bearing, a reproducer support jointed to the ring to swing about the bearing, a reproducer at the outer end of the reproducer support and a balance arm at the other end, the joint permitting the reproducer to raise and lower, a movable cam carried by the shaft and disposed above the balance arm, and a follower for the cam pivotally secured to the bearing and acting on the balance arm to depress the same and raise the reproducer.

72. In a multiple record phonograph, a ring mounted to swing about a vertical axis, a reproducer support mounted in a horizontal bearing carried by the ring to move about both axes, a reproducer at the outer end of the reproducer support and a balance arm at the other end, the reproducer being adapted to raise and lower, a movable cam carried above the balance arm, and a follower for the cam acting on the balance arm to depress the same and raise the reproducer.

73. Reproducer supporting mechanism for phonographs, comprising, a vertical bearing, a ring carried thereby and freely movable on the bearing, an eccentrically located horizontal bearing carried by the ring, and a two part, reproducer supporting arm secured to the horizontal bearing and carrying a reproducer at the outer end thereof, the two parts being connected by a joint adjacent the bearing which allows for swinging the reproducer upwardly about the joint for needle insertion but which limits the downward movement of the outer end of the arm about the joint.

74. Reproducer supporting mechanism for phonographs, comprising, a vertical bearing, a ring carried thereby and freely movable on the bearing, an eccentrically located horizontal bearing carried by the ring, a two part, reproducer supporting arm secured to the horizontal bearing and carrying a reproducer at the outer end thereof, the two parts being connected by a joint adjacent the bearing which allows for swinging the reproducer upwardly about the joint for needle insertion but which limits the downward movement of the outer end of the arm about the joint, a balance arm secured to the inner part of the two part arm, and a counter-weight carried thereby.

75. Reproducer supporting mechanism for phonographs, comprising, a vertical bearing, a ring carried thereby and freely movable on the bearing, an eccentrically located horizontal bearing carried by the ring, a reproducer supporting arm secured to the horizontal bearing and carrying a reproducer at the outer end thereof, a balance arm secured to the inner end of the arm, a vertically movable member carried by the bearing, and a cam movable independently of the ring for acting on the member to depress the balance arm and raise the reproducer.

76. Reproducer supporting mechanism comprising, a vertical bearing, a ring carried thereby and freely movable on the bearing and having upwardly extending bifurcations, a reproducer supporting arm pivotally mounted between the bifurcations, an arcuate counterweight supporting stamping concentric with the bearing and secured to the inner end of the record shifting arm, a cam actuated about the axis of the bearing, and a follower for the cam bearing on the arcuate portion of the stamping to raise the reproducer, the reproducer arm being swingable when in raised position.

77. Reproducer supporting mechanism comprising, a vertical bearing, a ring carried thereby and freely movable on the bearing and having upwardly extending bifurcations, a reproducer supporting arm pivotally mounted between the bifurcations, an arcuate counterweight supporting stamping concentric with the bearing and secured to the inner end of the record shifting arm, a counter-weight carried thereby, a cam actuated about the axis of the bearing, a follower for the cam bearing on the arcuate portion of the stamping to raise the reproducer, the reproducer arm being swingable when in raised position, and a stop limiting the lowering of the counter-weight when the reproducer is raised, the reproducer supporting arm having a joint to permit raising the reproducer after the stop has been engaged.

78. Reproducer supporting mechanism comprising, a vertical bearing, a ring carried thereby and freely movable on the bearing and having upwardly extending bifurcations, a reproducer supporting arm pivotally mounted between the bifurcations, an arcuate counterweight supporting stamping concentric with the bearing and secured to the inner end of the record shifting arm, record shifting mechanism including a cam actuated about the axis of the bearing and disposed above the arcuate part of the stamping, and a follower interposed between the cam and the stamping for raising the reproducer during record shifting, the reproducer arm being swingable when in raised position.

79. In a phonograph, a horizontal ring adapted to be mounted about a vertical axis, an upwardly extending eccentrically located post carried by the ring, a reproducer supporting arm pivotally carried by the post so that the reproducer carried thereby may raise or lower, a pawl supported by the ring to swing with the reproducer, and a pawl lifter pivotally supported from the ring and actuated by the reproducer supporting arm to lift the pawl when the reproducer is above a predetermined elevation.

80. In a phonograph, a horizontal ring adapted to be mounted about a vertical axis, an upwardly extending eccentrically located post carried by the ring, a reproducer, a reproducer supporting member pivotally carried by the post for vertical movement and connected to a counter-weight adjacent the ring and to a reproducer supporting arm opposite the counter-weight, said post serving as a fulcrum for said member intermediate of said reproducer and said counter-weight, so that the reproducer may rise with the lowering of the counter-weight, or may be raised without further lowering of the counter-weight, a pawl supported by the ring to swing with the reproducer, and a pawl lifter pivotally supported from the ring and actuated by the reproducer supporting member to lift the pawl when the reproducer is above a predetermined elevation.

81. In a phonograph, a horizontal ring adapted to be mounted about a vertical axis, an upwardly extending eccentrically located post carried by the ring, a reproducer supporting arm pivotally carried by the post so that the reproducer carried thereby may raise or lower, a pawl supported by the ring to swing with the reproducer, a ratchet disk engageable by the pawl, a pawl lifter pivotally supported from the ring and actuated by the reproducer supporting arm to lift the pawl when the reproducer is above a predetermined elevation, and a stationary shield plate for holding the pawl off the ratchet during a portion of the swinging movement of the reproducer and irrespective of the elevation of the reproducer.

82. In a phonograph, a horizontal ring adapted to be mounted about a vertical axis, an upwardly extending eccentrically located post carried by the ring, a reproducer supporting arm pivotally carried by the post so that the reproducer carried thereby may raise or lower, a pawl supported by the ring to swing with the reproducer, a pawl lifter pivotally supported from the ring and actuated by the reproducer supporting arm to lift the pawl when the reproducer is above a predetermined elevation, and a lateral extension carried by the ring for actuating the ring and positioning the reproducer.

83. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a motor, motor operated automatic record shifting mechanism for carrying out a cycle of operations upon the completion of a record whereby a new record is placed in playing position and the stylus placed in the sound grooves thereof, a ratchet plate, a trip switch in the motor circuit normally held open by the ratchet plate while the record is being played, the plate being actuated by a pawl moving with the reproducer support for releasing the trip switch at the end of a record, and means operated by the record shifting mechanism for moving the ratchet plate to a position to open the trip switch.

84. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a motor, motor operated automatic record shifting mechanism for carrying out a cycle of operations upon the completion of a record whereby a new record is placed in playing position and the stylus placed in the sound grooves thereof, a ratchet plate rotatably mounted coaxial with the reproducer support, a trip switch in the motor circuit normally held open by the ratchet plate while the record is being played, the plate being actuated by a pawl moving with the reproducer support for releasing the trip switch at the end of a record, and pawl means operated by the record shifting mechanism for moving the ratchet plate to a position to open the trip switch.

85. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a motor, motor operated automatic record shifting mechanism for carrying out a cycle of operations upon the completion of a record whereby a new record is placed in playing position and the stylus placed in the sound grooves thereof, a ratchet plate, a trip switch in the motor circuit normally held open by the ratchet plate while the record is being played, the plate being actuated by a pawl moving with the reproducer support for releasing the trip switch at the end of a record, and means operated by the record shifting mechanism for moving the ratchet plate to a position to open the trip switch, said means simultaneously passing out of controlling relation with the ratchet plate whereby over run of the motor does not affect the setting.

86. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a motor, motor operated automatic record shifting mechanism for carrying out a cycle of operations upon the completion of a record whereby a new record is placed in playing position and the stylus placed in the sound grooves thereof, a normally open record controlled trip switch in the motor circuit, and a device preset by the record shifting mechanism at the end of a record shifting cycle for opening the trip switch, the presetting means for the trip switch being unaffected by over run of the motor after the trip switch has opened the motor circuit.

87. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a record magazine, a motor, motor operated automatic record shifting mechanism for carrying out a cycle of operations upon the completion of a record whereby a new record is shifted from the magazine to the playing platform and the stylus placed in the sound grooves thereof, the record shifting mechanism including an oscillatory member coaxial with the reproducer support, a ratchet plate actuated to a predetermined position while the oscillatory member is moved in one direction, a trip switch in the motor circuit actuated by the ratchet plate to open position, a pawl carried by the reproducer support and swinging therewith, the pawl acting on inward movement of the reproducer support beyond a predetermined point to shift the ratchet plate to release the trip switch.

88. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a record magazine, a motor, motor operated automatic record shifting mechanism for carrying out a cycle of operations upon the completion of a record whereby a new record is shifted from the magazine to the playing platform and the stylus placed in the sound grooves thereof, the record shifting mechanism including an oscillatory member coaxial with the reproducer support, pawl mechanism actuated by the oscillatory member for actuating the ratchet plate to a predetermined position while the oscillatory member is moved in one direction, a trip switch in the motor circuit actuated by the ratchet plate to open position, the pawl passing by the ratchet plate during the over run of the motor, a second pawl carried by the reproducer support and swinging therewith, the second pawl acting on inward movement of the reproducer support beyond a predetermined point to shift the ratchet plate to release the trip switch.

89. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a record magazine, a motor, motor operated automatic record shifting mechanism for carrying out a cycle of operations upon the completion of a record whereby a new record is shifted from the magazine to the playing platform and the stylus placed in the sound grooves thereof, the record shifting mechanism including an oscillatory member coaxial with the reproducer support, a freely rotatable ratchet plate actuated a portion of a revolution, while the oscillatory member is moved in one direction, to place it in a predetermined position, a trip switch in the motor circuit actuated by the ratchet plate to open position, a pawl carried by the reproducer support and swinging therewith, means to hold the pawl off the ratchet plate while the reproducer support is beyond a predetermined distance from the axis of the playing platform, the means releasing the pawl when within a predetermined distance from the axis of the playing platform, so that the pawl may act on the ratchet plate to advance it and release the trip switch.

90. In a multiple record phonograph, record shifting mechanism, a playing platform for records to be played, a progressively movable ratchet disk resettable by the record shifting mechanism to a predetermined position, a trip switch opened thereby and held open, said trip switch controlling the operation of the record shifting mechanism, a pawl movable with the reproducer and engageable with the ratchet disk to shift it to release the trip switch when the reproducer is brought within a predetermined radius of the playing platform axis while playing a record or when the reproducer is repeatedly shifted in by an eccentric groove lying outside of said radius.

91. In a multiple record phonograph, record shifting mechanism, a playing platform for records to be played, a ratchet disk resettable by the record shifting mechanism to a predetermined position, a trip switch opened thereby, said trip switch controlling the operation of the record shifting mechanism, a retaining pawl for preventing retrograde movement of the disk, a pawl movable with the reproducer and engageable with the ratchet disk to shift it to release the trip switch when the reproducer is brought within a predetermined radius of the playing platform axis while playing a record or when the reproducer is repeatedly shifted in by an eccentric groove lying outside of said radius.

92. In a multiple record phonograph, record shifting mechanism, a playing platform for records to be played, a ratchet disk having downwardly extending lugs whereby the record shifting mechanism may set it in a predetermined position, a trip switch, actuated by other lugs on the disk, said trip switch controlling the operation of the record shifting mechanism, a pawl movable with the reproducer and engageable with the ratchet disk to shift it to release the trip switch when the reproducer is brought within a predetermined radius of the playing platform axis while playing a record or when the reproducer is repeatedly shifted in by an eccentric groove lying outside of said radius.

93. In a multiple record phonograph, a playing platform, a revolvable plate, record shifting means having means for advancing the plate step by step each time the record shifting means operates, a trip switch opened by the plate, said trip switch controlling the operation of the record shifting means, means including said plate for controlling said switch, a reproducer movable about the axis of the plate, means actuated under the control of the reproducer for advancing the plate as the reproducer moves across the playing platform within a predetermined radius of the platform axis, or is repeatedly shifted inwardly by an eccentric groove on the record lying outside said radius.

94. In a multiple record phonograph, a playing platform, a revolvable ratchet plate, record shifting means having means for advancing the plate step by step each time the record shifting means operates, a trip switch opened by the plate, said trip switch controlling the operation of the record shifting means, means including said plate for controlling said switch, a reproducer movable about the axis of the plate and carrying a pawl cooperative with the plate to advance the plate as the reproducer moves across the playing platform within a predetermined radius of the platform axis, or is repeatedly shifted inwardly by an eccentric groove on the record lying outside said radius.

95. In a multiple record phonograph, a playing platform, a revolvable plate having ratchet teeth, record shifting means having means for advancing the plate step by step each time the record shifting means operates, a trip switch opened by the plate, said trip switch controlling the operation of the record shifting means, a reproducer movable about the axis of the plate, and a pawl cooperative with the ratchet teeth to advance the plate as the reproducer moves across the playing platform to be within a predetermined radius of the platform axis, or is repeatedly shifted inwardly by an eccentric groove on the record lying outside said radius.

96. In a multiple record phonograph, a record shifting mechanism including a one revolution shaft connected by a crank to an oscillatory arm mounted on a vertical axis, a revolvable plate mounted about said axis and having lugs engageable by a pawl oscillated by the crank to set the plate in predetermined position, the edge of the plate carrying switch operating lugs and ratchet toothed sections, a trip switch held open by one of the switch operating lugs when the plate is set, said trip switch controlling the operation of the record shifting mechanism, a retaining pawl cooperating with one section of ratchet teeth, and a reproducer actuated pawl cooperable with another section of ratchet teeth for shifting the plate to release the switch.

97. In a multiple record phonograph, a record shifting mechanism including a one revolution shaft connected by a crank to an oscillatory arm mounted on a vertical axis, a revolvable plate mounted about said axis and having lugs engageable by a pawl oscillated by the crank to set the plate in predetermined position, the edge of the plate carrying switch operating lugs and ratchet toothed sections, a trip switch held open by one of the switch operating lugs when the plate is set, said trip switch controlling the operation of the record shifting mechanism, a retaining pawl cooperating with one section of ratchet teeth, a reproducer actuated pawl cooperable with another section of ratchet teeth for shifting the plate to release the switch, and means for holding the reproducer actuated pawl away from the ratchet teeth when the reproducer is above a predetermined elevation.

98. In a multiple record phonograph, a record shifting mechanism including a one revolution shaft connected by a crank to an oscillatory arm mounted on a vertical axis, a revolvable sheet metal plate mounted about said axis and having downwardly extending radial lugs engageable by a pawl extending upwardly from the crank to set the plate in predetermined position, the edge of the plate carrying downwardly extending switch operating lugs and ratchet toothed sections, separated by toothless sections of smaller radius, a trip switch held open by one of the switch operating lugs when the plate is set, said trip switch controlling the operation of the record shifting mechanism, a retaining pawl cooperating with one section of ratchet teeth, and a reproducer actuated pawl cooperable with another section of ratchet teeth for shifting the plate to release the switch, the toothless sections limiting the extent to which the plate may be moved by the reproducer.

99. In a multiple record phonograph including a motor, a trip switch biased toward closed position and automatically opened during a record shifting cycle to control said motor, and reproducer operated switch closing means acting in response to the repeated inward movements caused by an eccentric groove oscillating the reproducer, or in response to a single inward movement beyond a predetermined point, and means for disconnecting the switch closing means and reproducer when the reproducer is above a predetermined height.

100. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a record magazine, a motor, motor operated automatic record shifting mechanism for carrying out a cycle of operations upon the completion of a record whereby a new record is shifted toward the platform and the reproducer is shifted in to meet this record, whereupon the record is shifted to the platform and the stylus placed in the sound grooves thereof, a ratchet plate, a trip switch normally held open by the ratchet plate while the record is being played, said trip switch controlling the operation of said motor, the plate being actuated by a pawl moving with the reproducer support for releasing the trip switch at the end of a record, means for holding the pawl out of engagement with the ratchet plate while the reproducer is being shifted in to meet the record, and means operated by the record shifting mechanism for moving the ratchet plate to a position to open the trip switch.

101. In a multiple record phonograph, in combination, a rotatable playing platform adapted to support records to be played, a reproducer and stylus carried on a swinging reproducer supporting arm and cooperative with the grooves in the record and adapted to be moved thereby across the platform, a record magazine, a motor, motor operated automatic record shifting mechanism for carrying out a cycle of operations upon the completion of a record whereby a new record is shifted from the magazine to the playing platform and the stylus placed in the sound grooves thereof, said mechanism including means whereby the reproducer is shifted inwardly at an elevation above the playing platform during a part of the cycle, a ratchet plate actuated to a predetermined position by the record shifting mechanism, a trip switch in the motor circuit actuated by the ratchet plate to open position, a pawl carried by the reproducer support and swinging therewith, the pawl acting on inward movement of the reproducer support beyond a predetermined point to shift the ratchet plate to release the trip switch only when below a predetermined elevation which is below the elevation of the reproducer when shifted in by the record shifting mechanism.

102. A multiple record phonograph having record shifting mechanism under the control of an auxiliary motor, the circuit for which is closed by a record controlled trip switch, means controlled by the record grooves at the end of a record for actuating said trip switch, the record shifting mechanism including means whereby the reproducer is raised to a predetermined elevation and then shifted inwardly at this elevation toward the axis of the playing platform to meet a record being shifted, and mechanism for disabling said actuating means, while the reproducer is being shifted in by the record shifting mechanism.

103. A multiple record phonograph having record shifting mechanism under the control of an auxiliary motor, the circuit for which is closed by a record controlled trip switch, ratchet and pawl mechanism actuated by the record grooves at the end of a record for operating said trip switch, the record shifting mechanism including means whereby the reproducer is raised to a predetermined elevation and then shifted inwardly at this elevation toward the axis of the playing platform to meet a record being shifted, the pawl being raised off the ratchet while the reproducer is being shifted in by the record shifting mechanism.

JACK POTTER STOCKTON.